United States Patent
Dubey et al.

(10) Patent No.: US 10,950,021 B2
(45) Date of Patent: Mar. 16, 2021

(54) AI-DRIVEN DESIGN PLATFORM

(71) Applicant: Accenture Global Solutions Limited, Dublin (IE)

(72) Inventors: Alpana A. Dubey, Bangalore (IN); Mary Elizabeth Hamilton, San Mateo, CA (US); Manish Mehta, Milpitas, CA (US); Suma Mani Kuriakose, Mumbai (IN); Nitish A. Bhardwaj, Bangalore (IN); Kumar Abhinav, Hazaribag (IN)

(73) Assignee: Accenture Global Solutions Limited, Dublin (IE)

( * ) Notice: Subject to any disclaimer, the term of this patent is extended or adjusted under 35 U.S.C. 154(b) by 3 days.

(21) Appl. No.: 16/391,429

(22) Filed: Apr. 23, 2019

(65) Prior Publication Data
US 2019/0325628 A1    Oct. 24, 2019

(30) Foreign Application Priority Data

Apr. 23, 2018 (IN) .............................. 201811015357

(51) Int. Cl.
*G06T 11/00*    (2006.01)
*G06T 11/60*    (2006.01)
(Continued)

(52) U.S. Cl.
CPC .......... *G06T 11/60* (2013.01); *G06F 16/9038* (2019.01); *G06F 30/00* (2020.01);
(Continued)

(58) Field of Classification Search
CPC .......... G06T 11/60; G06T 7/11; G06T 11/001; G06N 3/0445; G06N 20/00; G06N 3/0454;
(Continued)

(56) References Cited

U.S. PATENT DOCUMENTS 8,266,519 B2    9/2012    Verma et al.
8,271,870 B2    9/2012    Verma et al.
(Continued)

FOREIGN PATENT DOCUMENTS

CN    103443787    12/2013
EP    2081118    7/2009
(Continued)

OTHER PUBLICATIONS

Pham et al., "SceneCut: Joint Geometric and Object Segmentation for Indoor Scenes", May 24, 2018 (Year: 2018).*
(Continued)

*Primary Examiner* — Aaron W Carter
(74) *Attorney, Agent, or Firm* — Fish & Richardson P.C.

(57) ABSTRACT

Implementations of the present disclosure include receiving a content image depicting a first set of objects and a style image depicting a second set of objects and a collective style, processing, by the design generation assistant, the content image using one or more ML models to determine a first sub-set of objects, to which a style is to be transferred from the style image, the first sub-set of objects including fewer objects than the first set of objects, processing, by the design generation assistant, the style image using the ML models to determine a second sub-set of objects, from which the style is to be transferred, and generating, by the design generation assistant, an output image with stylized objects, each stylized object including an object in the first sub-set of objects having the style of the one or more objects in the second sub-set of objects.

27 Claims, 14 Drawing Sheets

(51) Int. Cl.
*G06N 20/00* (2019.01)
*G06N 3/04* (2006.01)
*G06T 7/11* (2017.01)
*G06F 16/9038* (2019.01)
*G06F 30/00* (2020.01)
*G06F 3/0484* (2013.01)
*H04L 29/06* (2006.01)
*G06F 111/02* (2020.01)
*G06F 119/18* (2020.01)

(52) U.S. Cl.
CPC ......... *G06N 3/0445* (2013.01); *G06N 3/0454* (2013.01); *G06N 20/00* (2019.01); *G06T 7/11* (2017.01); *G06F 3/0484* (2013.01); *G06F 2111/02* (2020.01); *G06F 2119/18* (2020.01); *H04L 67/42* (2013.01)

(58) Field of Classification Search
CPC .......... G06N 3/006; G06N 5/022; G06N 3/08; H04L 67/42; G06F 16/583; G06F 16/3329; G06F 30/00; G06F 16/9038; G06F 2111/02; G06F 2119/18; G06F 3/0484; G06F 30/10; G06F 30/27
See application file for complete search history.

(56) References Cited

U.S. PATENT DOCUMENTS

| | | | |
|---|---|---|---|
| 8,412,516 | B2 | 4/2013 | Verma et al. |
| 8,442,985 | B2 | 5/2013 | Verma et al. |
| 8,566,731 | B2 | 10/2013 | Subramanian et al. |
| 8,671,101 | B2 | 3/2014 | Verma et al. |
| 8,677,313 | B2 | 3/2014 | Sharma et al. |
| 8,843,819 | B2 | 9/2014 | Verma et al. |
| 9,015,011 | B2 | 4/2015 | Sarkar et al. |
| 9,183,194 | B2 | 11/2015 | Verma et al. |
| 9,384,187 | B2 | 7/2016 | Verma et al. |
| 9,400,778 | B2 | 7/2016 | Ramani et al. |
| 9,535,982 | B2 | 1/2017 | Verma et al. |
| 10,535,164 | B2* | 1/2020 | Shlens ............... G06N 3/04 |
| 2014/0351694 | A1 | 11/2014 | Verma et al. |
| 2017/0076179 | A1* | 3/2017 | Martineau ............. G06N 3/0454 |
| 2018/0075602 | A1* | 3/2018 | Shen ........................ G06T 7/50 |
| 2019/0236814 | A1* | 8/2019 | Shlens ..................... G06T 11/00 |
| 2019/0244329 | A1* | 8/2019 | Li .......................... G06N 3/084 |
| 2019/0325008 | A1 | 10/2019 | Dubey et al. |
| 2019/0325088 | A1* | 10/2019 | Dubey .................. G06T 11/001 |
| 2019/0325628 | A1* | 10/2019 | Dubey ................... G06F 30/00 |
| 2019/0392192 | A1* | 12/2019 | Dubey .................. G06K 9/3233 |
| 2020/0082578 | A1* | 3/2020 | Shlens .................. G06T 11/001 |
| 2020/0090318 | A1* | 3/2020 | Azoulay ............... G06T 7/0002 |
| 2020/0117348 | A1* | 4/2020 | Jang ..................... G06F 3/04845 |
| 2020/0193222 | A1* | 6/2020 | Singh ........................ G06N 3/08 |
| 2020/0312042 | A1* | 10/2020 | Sardari .................... G06T 17/05 |

FOREIGN PATENT DOCUMENTS

| | | |
|---|---|---|
| EP | 2296094 | 3/2011 |
| EP | 2362333 | 8/2011 |
| WO | WO 2012106133 | 8/2012 |

OTHER PUBLICATIONS

Li et al., "A closed-form solution to photorealistic image stylization," The European Conference on Computer Vision (ECCV), Munich, Germany, Sep. 8-14, 2018, 23 pages.

Feng et al., "MeshNet: Mesh Neural Network for 3D Shape Representation," arXiv, Nov. 28, 2018, arXiv:1811.11424v1, 9 pages.

Gatys et al., "A Neural Algorithm of Artistic Style," arXiv, Aug. 26, 2015, arXiv:1508.06576v1, 16 pages.

Hanocka et al., "MeshCNN: A Network with an Edge," ACM Trans. Graphics, Feb. 2019, 1(1):90, 12 pages.

Mo et al., "PartNet: A Large-scale Benchmark for Fine-grained and Hierarchical Part-level 3D Object Understanding." Proceedings of the 2019 IEEE/CVF Conference on Computer Vision and Pattern Recognition (CPVR), Jun. 16-20, 2019, Long Beach, California, USA, 909-918.

Qi et al., "PointNet: Deep Learning on Point Sets for 3D Classification and Segmentation," arXiv, Apr. 10, 2017, arXiv:1612.00593v2, 19 pages.

Szegedy et al., "Going deeper with convolutions," arXiv, Sep. 17, 2014, arXiv:1409.4842v1, 12 pages.

Szegedy et al., "Inception-v4, Inception-ResNet and the Impact of Residual Connections on Learning," arXiv, Aug. 23, 2016, arXiv:1602.07261v2, 12 pages.

Szegedy et al., "Rethinking the Inception Architecture for Computer Vision," arXiv, Dec. 11, 2015, arXiv:1512.00567v3, 10 pages.

Princeton.edu [online], "Princeton ModelNet," available on or before Mar. 9, 2015 via Internet Archive: Wayback Machine URL<https://web.archive.org/web/20150309054238/https://modelnet.cs.princeton.edu/download.html>, retrieved on Nov. 6, 2020, retrieved from URL<https://modelnet.cs.princeton.edu/download.html>, 3 pages.

Wu et al., "3D ShapeNets: A Deep Representation for Volumetric Shapes," Proceedings of the 2015 IEEE Conference on Computer Vision and Pattern Recognition (CFVR), Jun. 7-12, 2015, Boston, Massachusetts, USA, 1912-1920.

* cited by examiner

§25.785 Seats, berths, safety belts, and harnesses.

§25.817 Maximum number of seats abreast.

§25.815 Width of aisle.

The passenger aisle width at any point between seats must equal or exceed the values in the following table:

| Passenger seating capacity | Minimum passenger aisle width (inches) | |
| --- | --- | --- |
| | Less than 25 in. from floor | 25 in. and more from floor |
| 10 or less | ¹12 | 15 |
| 11 through 19 | 12 | 20 |
| 20 or more | 15 | 20 |

¹A narrower width not less than 9 inches may be approved when substantiated by tests found necessary by the Administrator.

[Amdt. 25-15, 32 FR 13265, Sept. 20, 1967, as amended by Amdt. 25-38, 41 FR 55466, Dec. 20, 1976]

AI-DRIVEN DESIGN PLATFORM

CROSS-REFERENCE TO RELATED APPLICATIONS

This application claims priority to Indian Prov. App. No. 201811015357, filed on Apr. 23, 2018, the disclosure of which is expressly incorporated herein by reference in the entirety.

BACKGROUND

Product lifecycles can include multiple processes. Example processes can include, without limitation, a design process, a testing process, and a production process. Each process can include one or more phases. For example, an example design process can include a requirements phase, a design phase, an evaluation phase, and a prototyping phase.

In the design phase, a product is designed. Example products can include individual objects (e.g., chair, couch, table) and spaces (e.g., room, vehicle interior). Design can include wholly original designs, combinations of existing designs, and derivatives of existing designs. In modern design processes, much of the design process is performed using computers and design information stored as data (e.g., multi-dimensional models, images). For example, a designer can use computer-executable design tools to generate designs represented in digital files (e.g., model files, image files). The design process, however, can be a tedious, iterative process as the designer seeks to capture an appealing design. This can include both the shape of objects as well as styles applied to objects. Consequently, the design process can place a significant demand on resources, such as processors and memory, as the designer iterates over multiple designs.

SUMMARY

Implementations of the present disclosure are generally directed to computer-implemented systems for assisting in product design phases. More particularly, implementations of the present disclosure are directed to a computer-implemented, artificial intelligence (AI)-based design platform for assisting in design phases of products.

In some implementations, actions include receiving, by a design generation assistant of the AI-based design platform, a content image depicting a first set of objects and a style image depicting a second set of objects and a collective style, processing, by the design generation assistant, the content image using one or more machine learning (ML) models to determine a first sub-set of objects including one or more objects, to which a style is to be transferred from the style image, the first sub-set of objects including fewer objects than the first set of objects, processing, by the design generation assistant, the style image using one or more ML models to determine a second sub-set of objects including one or more objects, from which the style is to be transferred to objects in the first sub-set of objects, and generating, by the design generation assistant, an output image depicting one or more stylized objects, each stylized object including an object in the first sub-set of objects having the style of the one or more objects in the second sub-set of objects, a remainder of the output image including un-stylized content of the content image. Other implementations include corresponding systems, apparatus, and computer programs, configured to perform the actions of the methods, encoded on computer storage devices.

These and other implementations may each optionally include one or more of the following features: generating the output image includes merging a masked content image and a masked stylized content image, the masked content image depicting the un-stylized content of the content image and masking the first sub-set of objects, the masked stylized content image depicting the stylized objects and masking other content; an object image is provided from the style image, the object image depicting second sub-set of objects; generating the output image includes providing the content image and the object image as image to a style transfer model that generates a stylized content image based on the style of the object image, an entirety of content in the content image being stylized to provide the stylized content image; the style transfer model includes PhotoWCT; the first sub-set of objects is determined based on object input that indicates at least one type of object that is to be stylized; the second sub-set of objects is determined based on object input that indicates at least one type of object, from which the style is to be transferred to objects in the first sub-set of objects; the one or more ML models include MaskRCNN, SceneCut, and RefineNet; MaskRCNN processes an image to segment objects depicted in the image, and SceneCut and RefineNet process the image to segment planar surfaces depicted in the image; and the style image is provided from a trendspotting assistant of the AI-based design platform.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 7A-7C depict an example use case in accordance with implementations of the present disclosure.

Like reference symbols in the various drawings indicate like elements.

DETAILED DESCRIPTION

Figure 1:
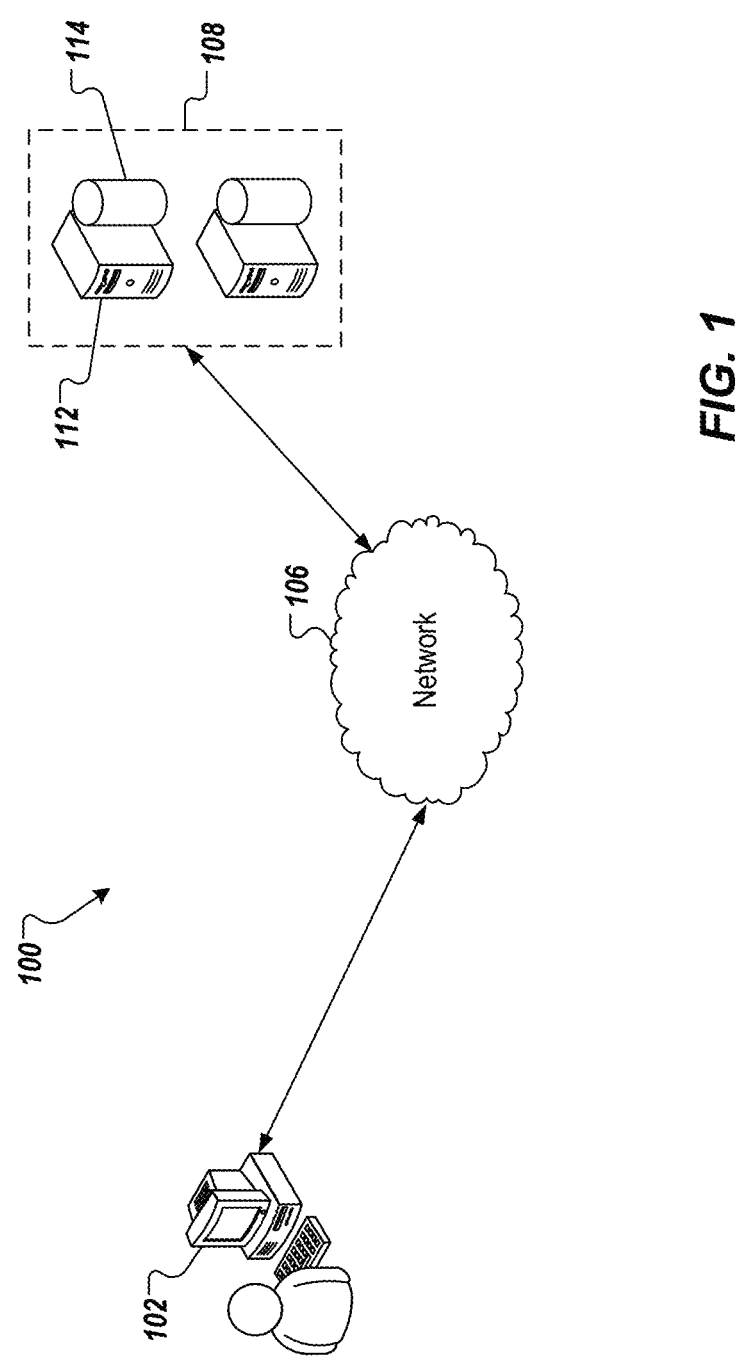
FIG. 1 depicts an example system that can execute implementations of the present disclosure.

Implementations of the present disclosure are generally directed to computer-implemented systems for assisting in product design phases. More particularly, implementations of the present disclosure are directed to a computer-implemented, artificial intelligence (AI)-based design platform for assisting in design phases of products. As described in further detail herein, the AI-based design platform includes a suite of AI-driven design assistants that can be used to generate designs and alert designers to one or more regulations that are applicable to the subject matter of the design. In some examples, the AI-based design platform of the present disclosure can streamline the design process resulting in a reduced number of iterations over designs and reduced consumption of resources (e.g., processors, memory) used in the design process.

In some implementations, actions include receiving, by a design generation assistant of the AI-based design platform, a content image depicting a first set of objects and a style image depicting a second set of objects and a collective style, processing, by the design generation assistant, the content image using one or more machine learning (ML) models to determine a first sub-set of objects including one or more objects, to which a style is to be transferred from the style image, the first sub-set of objects including fewer objects than the first set of objects, processing, by the design generation assistant, the style image using one or more ML models to determine a second sub-set of objects including one or more objects, from which the style is to be transferred to objects in the first sub-set of objects, and generating, by the design generation assistant, an output image depicting one or more stylized objects, each stylized object including an object in the first sub-set of objects having the style of the one or more objects in the second sub-set of objects, a remainder of the output image including un-stylized content of the content image.

To provide context for implementations of the present disclosure, a product lifecycle can include multiple processes. Example processes can include, without limitation, a design process, a testing process, and a production process. Each process can include one or more phases. For example, an example design process can include a requirements phase, a design phase, an evaluation phase, and a prototyping phase. In some examples, the requirements phase includes provision of a high-level outline (e.g., notes, sketches) of the product including requirements (e.g., expected features, functions, and the like). In some examples, the design phase can include producing a product design based on the requirements. For example, modeling tools (e.g., Creo, AutoCAD, Catia, SolidWorks, Onshape) to produce computer-implemented models (e.g., 2D/3D models) of the product. In some examples, the evaluation phase can include evaluating the product model (e.g., FEA, CFD, MBD, structural analysis, thermal analysis, stability analysis) using evaluation tools (e.g., Ansys, Hypermesh, Hyperworks) to identify strengths/weaknesses, and/or whether the product model meets the requirements. In some examples, the prototyping phase includes producing a physical prototype of the product based on the product design. For example, the product model is converted to code for CNC machining, and/or 3D using one or more prototyping tools (e.g., Creo, DellCAM, MasterCAM).

In each instance, the design process is iterative. For example, iterations of designs are provided, each iteration including changes to an earlier design. Inefficiencies are introduced, as the number of iterations increases. That is, for example, at each iteration, designers spend time, and resources (e.g., computing resources) to refine the design. Current design processes lack tools to reduce the number of iterations, and increase the efficiency of the design process.

In view of this, and as described in further detail herein, implementations of the present disclosure provide an AI-based design platform for assisting in the design process of products. In some implementations, and as described in further detail herein, the AI-based design platform of the present disclosure provides a human-AI teaming structure, in which computer-implemented, AI-based design assistants work with human designers to improve the efficiency of the design process. In some examples, the AI-based design platform reduces rework cost by instant evaluation of design using advanced analytics tools and brings more creativity in designs through "Creative AI" approaches such as generative designs and style transfer and optimizing product design by incorporating product usage details in the design.

In further detail, the AI-based design platform includes a suite of AI-driven design assistants that improve the efficiency of the iterative design process. In some implementations, the suite of AI-driven design assistants includes a design generation assistant, a trendspotting assistant, a design optimization assistant, a design visualization assistant, a digital twin management assistant, and a regulation assistant, each of which is described in further detail herein.

Implementations of the present disclosure are described in further detail herein with reference to an example use case. The example use case includes design of an aircraft interior including, for example, passenger seat design, flooring design, and interior wall design. The example use case reflects a use case, in which governmental regulations are to be considered, as described in further detail herein. Although the example use case is described herein for purposes of illustration, it is contemplated that implementations of the present disclosure can be realized in any appropriate use case.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link. For example, mobile computing devices, such as smartphones can utilize a cellular network to access the network 106.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host an AI-based design platform in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

As introduced above, implementations of the present disclosure provide an AI-based design platform for assisting in the design process of products. In some implementations, the AI-based design platform provides design recommendation assistance to recommend one or more designs, and/or design features based on requirements (e.g., primary goals) of the product, and/or based on identified trends. In some implementations, the AI-based design platform provides design generation assistance to automatically, or semi-automatically generate designs based on product usage. In some implementations, the AI-based design platform provides design evaluation assistance to evaluate designs based on one or more parameters (e.g., strength, durability, material cost, material volume). In some implementations, the AI-based design platform provides design manufacturing assistance. For example, the AI-based design platform can evaluate whether a particular design can be manufactured, and/or the relative difficulty of manufacture.

Figure 2:
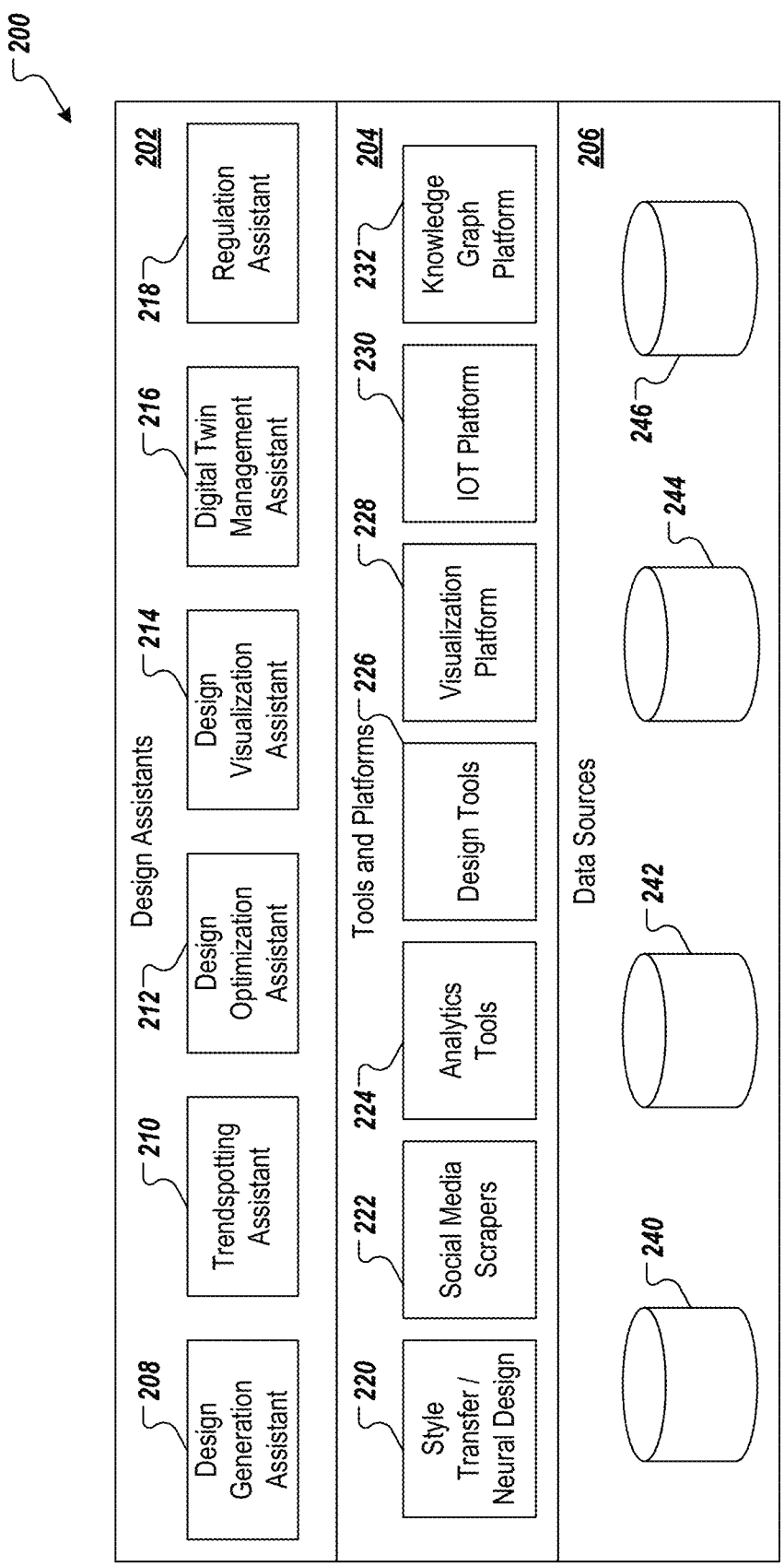
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a design assistants layer 202, a tools and platforms layer 204 and a data sources layer 206. In some examples, the design assistants layer 202 includes a suite of AI-driven design assistants provided by the AI-based design platform of the present disclosure. In some examples, the tools and platforms layer 204 includes analytics tools and data management platforms (e.g., provided by one or more third-parties). In some examples, the data sources layer 206 includes a plurality of data sources that provide data ingested into and processed by the AI-based design platform, as described in further detail herein.

In the depicted example, the suite of AI-driven design assistants includes a design generation assistant 208, a trendspotting assistant 210, a design optimization assistant 212, a design visualization assistant 214, a digital twin management assistant 216, and a regulation assistant 218. In some examples, each of the design assistants in the suite of design assistants can be provided as one or more computer-executable programs executed by one or more computing devices.

In some implementations, the design generation assistant 208 provides multiple, AI-based functionality that generates design based on input data. Example input data includes, without limitation, content data and style data. For example, and as described in further detail herein, the design generation assistant 208 can process a content image and a style image to generate a design image (also referred to herein as a stylized image). In some examples, the design image includes content of the content image having style of the style image applied thereto. In some implementations, and as described in further detail herein, the design generation assistant 208 provides pattern generation functionality using style transfer, multi-object style transfer functionality, and shape generation functionality.

In some implementations, the trendspotting assistant 210 processes data from one or more data sources (e.g., social media data), described in further detail herein, to identify trending styles and/or trending content. In some examples, a set of style images can be provided, each style image representative of a trending style identified by the trendspotting assistant 210. In some examples, a set of content images can be provided, each content image representative of a trending content identified by the trendspotting assistant 210. For example, the trendspotting assistant 210 can ingest social media data including text and images, and process the social media data using a trendspotting algorithm to identify trending styles (e.g., colors, patterns) and/or content (e.g., furniture shapes). Example processing can include, without limitation, natural language processing (NLP) to identify positively/negatively trending styles (e.g., an image associated with text that describes a style in the image as positive/negative) and/or positively/negatively trending content (e.g., an image associated with text that describes a content in the image as positive/negative). The resulting set of style images and/or set of content images can be made available for use with the design generation assistant 208 to produce new designs, as described herein.

In some implementations, the trendspotting assistant 210 can predict a popularity of a design that is generated by the design generation assistant 208. In some examples, a popularity predictive model is trained based on data of existing product models, features, feedback, and reviews. In some examples, the popularity predictive model can process a design image generated by the design generation assistant 208 and output a popularity prediction. In some examples, the popularity prediction represents a degree to which the design captured in the design image is likely to be considered popular.

In some implementations, the design optimization assistant 212 enables optimization of designs generated by the design generation assistant 208. For example, products are expected to be durable, stable, and optimized. Optimization can be industry-specific. For example, in the aviation industry, weight is an important factor. Weight of a design (e.g., aircraft seat) can be optimized by removing unnecessary material, while keeping the design equally strong. For example, design features can be introduced which increase strength enabling amount of material to be reduced. In some implementations, the design optimization assistant 212 can process a design based on sensor data. For example, a design can be optimized through data collected from one or more sensors (e.g., pressure sensors on a chair), which sensor data is used adjust design features (e.g., shape).

In some implementations, the design visualization assistant 214 enables visualization of designs generated by the design generation assistant 208. In some implementations, visualization of a design can be provided using virtual reality (VR), mixed reality (MR), and/or augmented reality (AR). In some examples, visualization of a design enables the designer to review the totality of the design and make manual adjustments prior to a subsequent phase (e.g., prototyping).

In some implementations, the digital twin management assistant 216 provides for management of a so-called digital twin, which is a digital representation of a real-world, physical entity (e.g., chair, table, room). In some examples, the digital representation provides both static and dynamic properties of the physical entity. For example, for a seat, the dynamic properties may capture aspects such as load, pressure, and the like. In some implementations, the digital twin management assistant 216 integrates Internet-of-Things (IoT), AI, machine learning and analytics to create the digital twin, which can be used to predict the nature and shape of its physical counterparts. In various industrial sectors, digital twins are used to optimize the operation and maintenance of physical assets, systems and manufacturing processes. For example, a digital twin of a human can help to estimate the required shape, size and strength of the chair in aircraft interior design. In some implementations, the digital twin management assistant 216 maintains data obtained from product digital twins and aggregates their dynamics for different scenarios.

In some implementations, the regulation assistant 218 identifies regulations that may be relevant to a particular design. For example, and with reference to the example use case, governmental agencies have regulations regarding various aspects of various industries (e.g., automotive, trains, airlines, ships). In accordance with implementations of the present disclosure, the regulation assistant 218 uses information extraction (IE) and natural language processing (NLP) to identify regulations from regulatory documents that may be relevant to a component and/or a space that is being designed. As described in further detail herein, the regulation assistant 218 can alert designers to regulatory requirements of a particular design to ensure that the design complies with applicable regulations.

In the depicted example, the tools and platforms layer 204 includes a style transfer/neural design tool 220, one or more social media scraping tools 222, one or more analytics tools 224, one or more design tools 226, a visualization platform 228, an IoT platform 230, and a knowledge graph (KG) platform 232. In some implementations, the tools and platforms of the tools and platforms layer 204 are leveraged by one or more assistants of the design assistants layer 202 to perform the functionality described herein.

In some implementations, the style transfer/neural design tool 220 supports pattern generation functionality using style transfer, multi-object style transfer functionality, and shape generation functionality of the design generation assistant 208. In some implementations, the one or more social media scraping tools 222 retrieve data (e.g., text, images) from one or more social media sites to generate sets of content images and/or sets of style images that can be used by the design generation assistant 208 and/or the trendspotting assistant 210, as described herein. In some implementations, the one or more analytics tools 224 can be used to process data from the one or more social media scrapping tools to determine analytical values. For example, the one or more analytics tools 224 can determine consumer sentiment (e.g., reflecting popularity of particular designs), and brand image adherence rates. An example analytics tool can include, without limitation, Netvibes Dashboard Intelligence provided by Dassault Systèmes.

In some implementations, the one or more design tools 226 can be used to execute generative design and/or design modification of designs generated by the design generation assistant 208. An example design tool can include, without limitation, the CATIA Generative Design. In some implementations, the visualization platform 228 supports the design visualization assistant 214 to provide AR/VR/MR visualizations of designs provided from the design generation assistant 208. An example visualization platform 228 includes, without limitation, Hololens provided by Microsoft Corporation. In some implementations, the IoT platform 230 enables procurement of sensor data from IoT sensors, which can be used in the design process, as described herein. For example, in the process of designing an optimized chair, IoT sensors are used to measure the pressure points on the chair and the resulting IoT data is used to guide the process of generative design. This will result in an optimized, lightweight and sustainable chair, which will reduce the cost as well as the weight (e.g., which, on an aircraft which is a critical point). An example IoT platform includes Thingworx provided by PTC Inc.

In some implementations, the KG platform 232 maintains one or more KGs that can be used by assistants of the design assistants layer 202. In some examples, a KG can be described as a knowledgebase that can be queried to provide query results. In general, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In accordance with implementations of the present disclosure, one or more knowledge graphs are used to extract relevant queries from complex documentation. Example documentation can include, for example, regulatory documents that may affect design. In some examples, queries extracted from the one or more knowledge graphs can be easily understood by users (designers). In this manner, the knowledge graphs reduce the complexity of manual design rules extraction, and improve the query retrieval process (e.g., speed up query retrieval).

In the depicted example, the data sources layer 206 includes multiple data sources that store data that can be used in generating design using the AI-based design platform 200. Example data sources include, without limitation, one or more social media data sources 240, one or more platform data sources 242, one or more enterprise data sources 244, and one or more general data sources 246.

As introduced above, the AI-based design platform provides a design generation assistant. In some implementations, the design generation assistant includes pattern generation, multi-object style transfer, and shape generation. In some implementations, pattern generation includes generation of designs by transferring features from one design to another using a deep neural network referred to herein as style transfer. In some examples, style transfer can be described as recomposing a content image based on a style depicted in a style image. In the design context, this can include recomposing the design and/or pattern of a particular object and/or surface (e.g., chair, floor, wall) depicted in a content image with a style depicted in a style image. In general, style transfer aims to provide an output (e.g., a stylized content image) with style as similar to the style depicted in the style image as possible, while maintaining the context and background of the context image. In accordance with implementations of the present disclosure, AI-based style transfer, AI-based generation of product shapes, and multi-object style transfer enable generation of several design ideas at a much faster pace with reduced consumption of technical resources (e.g., processors, memory).

Figure 3:
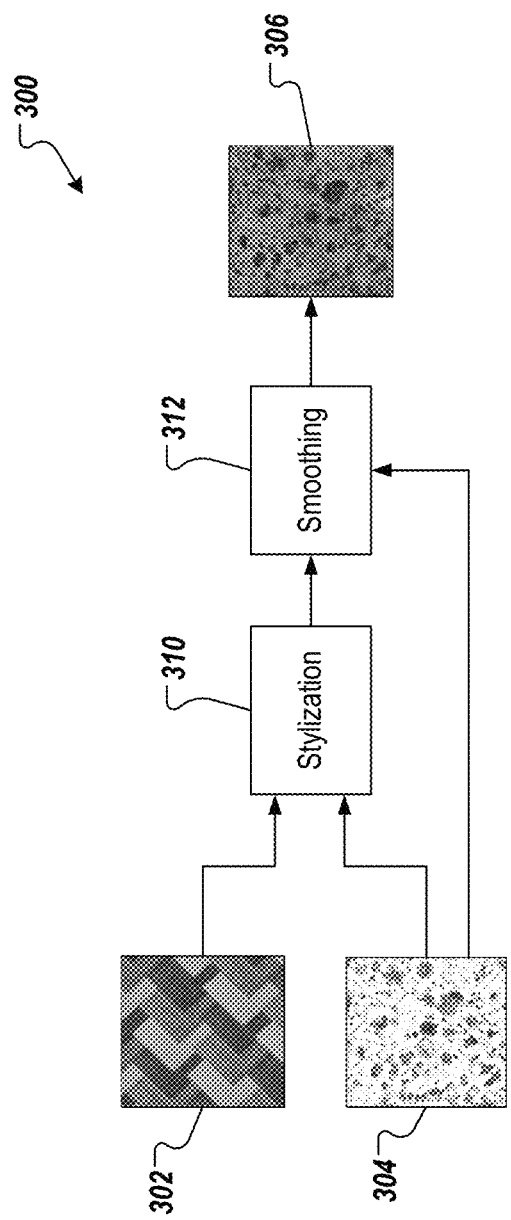
FIG. 3 depicts a conceptual diagram for pattern generation based on style transfer.

FIG. 3 depicts a conceptual diagram 300 for pattern generation based on style transfer. In general, style transfer refers to modifying a style of an image, while preserving content of the image. For example, and as depicted in FIG. 3, a style image 302 and a content image 304 can be provided. In the depicted example, style transfer refers to modifying the style of the content image 304 to reflect the style of the style image 302, while preserving the content of the content image 304. Applying style transfer, an output image 306 is provided, which includes the content of the content image 304 and the style of the style image 302.

In general, style transfer includes pre-processing of the style image 302 and the content image 304 (e.g., resizing the images to be of equal size, if needed), and processing of the style image 302 and the content image 304 through a machine learning (ML) model. An example ML model includes a pre-trained convolutional neural network (CNN). In general, the ML model includes multiple layers, and layers that address style and layers that address content can be known. In this manner, the layers can be separated to independently process style and content based on the style image 302 and the content image 304. Processing of the style image 302 and the content image 304 through the ML model can be described as optimization, through which both content loss and style loss are minimized. Minimization of the content loss enables the content represented within the content image 304 to be preserved, while minimization of the style loss enables application of the style of the style image 302 to the content represented within the content image.

In FIG. 3, a process of photorealistic image stylization is depicted in multiple steps, which include stylization 310 and smoothing 312. In some examples, stylization 310 generates an intermediate image based on the style image 302 and the content image 304. In some examples, stylization 310 includes application of a stylization transform (e.g., PhotoWCT). In some examples, stylization 310 directly matches feature correlations of the content image 304 to the feature correlations of the style image 302 using the two projections. In some examples, the smoothing 312 processes the intermediate image based on the content image 304 to remove noticeable artifacts and generate the output image 306 as a photorealistic stylized result. In some examples, smoothing 312 includes application of a photorealistic smoothing function. An example of photorealistic image stylization is provided in *A Closed-form Solution to Photorealistic Image Stylization* by Yijun Li et al. It is contemplated that implementations of the present disclosure can be realized using any appropriate image stylization technique.

As described in further detail herein, implementations of the present disclosure provide multi-object style transfer, which enables objects to be identified in a style image and styles of one or more objects of the style image to be applied to one or more objects in a content image. In some implementations, one or more objects within a content image are identified for style transfer, and style transfer is applied to each of the one or more objects, while a remainder of the content of the content image remains unaffected. That is, implementations of the present disclosure enable select objects within a content image to be stylized based on a style of one or more objects represented within a style image, while other objects within the content image are unaffected.

In further detail, multi-object style transfer includes object detection, segmentation, and style transfer. In some implementations, a style image is processed to detect objects depicted therein, and a style of one or more of the objects is extracted. In some implementations, a content image is processed to detect objects depicted therein, and one or more objects are selected for style transfer. The style extracted from the one or more of the objects of the style image is applied to the one or more objects of the content image to provide a stylized image.

In some implementations, object detection includes identifying objects in an image, bounding the object (e.g., with a rectangular box) and tagging each object with a label (e.g., identifying what the object is). In some examples, object detection is performed using a trained ML model that identifies objects in images. An example ML model includes, without limitation, the Faster-RCNN-Inception-V2-COCO model from the Model Zoo provided by TensorFlow. In some examples, the ML model is trained using training images, each training image having labels applied to objects depicted therein (e.g., a bound around an object with a label indicating what the object is (table, couch, chair)). In this manner, the ML model can be used to detect objects (e.g., type, location) within images (e.g., content images, style images).

In some implementations, segmentation includes partitioning of an image into multiple segments. In some examples, segmentation enables simplification and/or changing of the representation of an image into something that is more meaningful and easier to analyze. In some examples, segmentation emphasizes instance segmentation and semantic segmentation. In accordance with implementations of the present disclosure, style transfer is to be performed on one or more segments of an image (e.g., objects, surfaces), as opposed to the entirety of the image. In some implementations, segmentation is performed using deep learning techniques for both planar surfaces and objects. For example, a target object can be segmented and isolated from the remainder of the image (e.g., segmenting a chair within a style image depicted multiple objects).

In further detail, segmentation of an image includes processing the image to provide a segmented image that includes one or more of boundaries, color maps, masks, and annotations. For example, a boundary can bound a segment of within the image and are useful in performing style transfer. In some examples, a segment within the image can include a color to distinguish the segment from other segments within the image, wherein segments of the same color indicate a single type of object. For example, a segment representing a floor is assigned a first color, segments representing chairs are each assigned a second color, and a segment representing a wall is assigned a third color. Features such as masks, annotations, and color maps assist in isolating regions of interest from the remainder of the image.

In some implementations, segmentation of an image is performed using one or more ML models. Example ML models include, without limitation, MaskRCNN (a regional CNN having a first stage that scans the image and generates proposals (areas likely to contain an object), and a second stage that classifies the proposals and generates bounding boxes and masks), RefineNet (a multi-path refinement network for high-resolution semantic segmentation), and SceneCut (provides for joint geometric and object segmentation for indoor scenes). For example, objects (e.g., tables, chairs, couches) can be segmented within an image using MaskRCNN, and planar surfaces (e.g., floors, walls) are segmented using an ensemble ML model including SceneCut and RefineNet.

In accordance with implementations of the present disclosure, multi-object style transfer receives a content image, a style image, and one or more objects as input. The content image depicts one or more objects, to which style(s) of one or more objects of the style image are to be applied. In some examples, the one or more objects that are provided as input indicate, which objects style transfer is to be performed for. For example, a chair can be provided as an input object, and style transfer will be performed to transfer a style of a chair depicted in the style image to a chair depicted in the content image. More particularly, object detection and segmentation are performed for boundary extraction. For example, the input object is identified within the image using MaskRCNN, and surfaces within the image are labeled and segmented using RefineNet and SceneCut, respectively. Style transfer is performed using the extracted boundary of the style image and the corresponding extracted boundary of the content image. The style of the object of the style image is transferred to the object of the content image using segmentation masks (e.g., provided as output of MaskRCNN). A stylized image is provided, which includes the one or more objects of the content image stylized based on the respective one or more objects of the style image, while the remainder of the content image remains unchanged (e.g., un-stylized).

Figure 4:
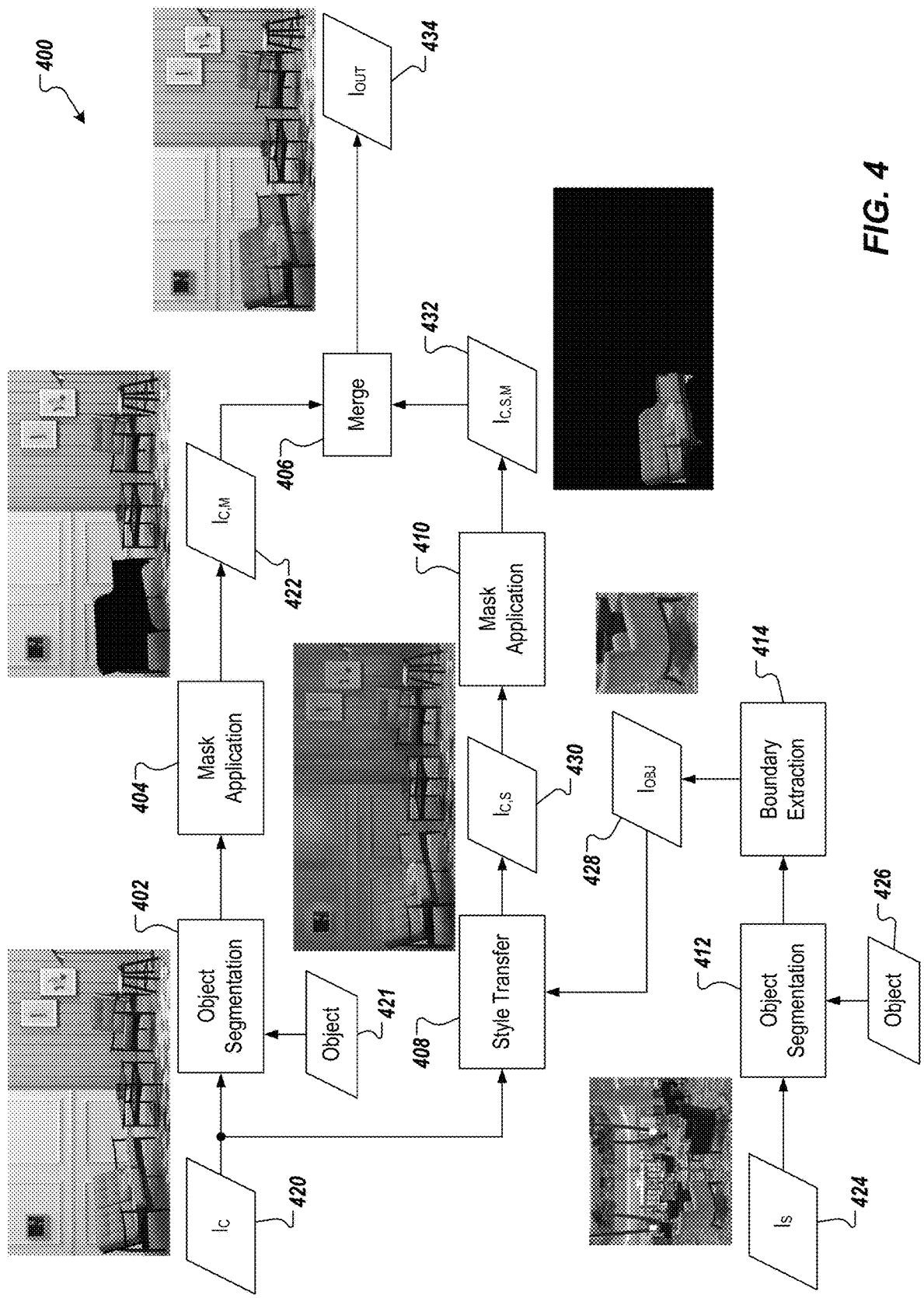
FIG. 4 depicts an example conceptual architecture for multi-object style transfer in accordance with implementations of the present disclosure.

FIG. 4 depicts an example conceptual architecture 400 for multi-object style transfer in accordance with implementations of the present disclosure. The example conceptual architecture 400 includes an object segmentation module 402, a mask application module 404, a merging module 406, a style transfer module 408, a mask application module 410, an object segmentation module 412, and a boundary extraction module 414. In some examples, the object segmentation module 402 and the object segmentation module 412 are provided as respective modules. In some examples, the object segmentation module 402 and the object segmentation module 412 are the same module. In some examples, the mask application module 404 and the mask application module 410 are provided as respective modules. In some examples, the mask application module 404 and the mask application module 410 are the same module.

As described in further detail herein, the multi-object style transfer of the present disclosure processes a content image ($I_C$) 420 in view of a style image ($I_S$) 424 to generate an output image ($I_{OUT}$) 434 (stylized image). At least one object depicted within the content image 420 is stylized based on a style of at least one object depicted in the style image 424 to provide a stylized object that is depicted in the output image 434.

In further detail, the content image 420 is processed by the object segmentation module 402 to identify and segment objects within the content image 420. For example, one or more objects 421 are provided as input to the object segmentation module 402 (e.g., a user provides input of couch, which indicates that any couch within the content image 420 is to be stylized). In some examples, the object segmentation module 402 processes the content image 420 in view of the object(s) 421 to identify and segment the object(s) within the content image 420 and provide respective object masks. For example, the object segmentation module 402 processes the content image 420 using MaskRCNN and RefineNet+SceneCut to extract boundaries of objects and surfaces within the content image 420. The object(s) 421 indicate which of one or more objects segmented within the content image 420 are to have style transfer applied. In the example of FIG. 4, the object 421 can indicate couch. Consequently, the couch depicted in the content image 420 can be determined to be the focus of style transfer.

In some implementations, the mask application module 404 applies one or more masks determined by the object segmentation module 402 to the content image 420 to provide a masked content image ($I_{C,M}$) 422. The masked content image 422 includes the object(s) 421 removed therefrom (e.g., the object(s) is/are blackened within the masked content image 422). In the depicted example, the couch, which is the object that is to be stylized based on the style image 424 is masked within the masked content image 422.

In some implementations, the style image 424 is processed by the object segmentation module 412 to identify and segment objects within the style image 420. For example, one or more objects 426 are provided as input to the object segmentation module 402 (e.g., a user provides input of chair, which indicates that a style of a chair within the style image 424 is to be used for style transfer). In some examples, one or more style objects can be selected from the style image 424, the style of the style object(s) being used for stylization. In some examples, the style object(s) can be manually selected. In some examples, the style object(s) can be automatically selected. In some examples, a single style object can be selected to provide one-to-one or one-to-many style transfer. In some examples, multiple style objects can be selected to perform many-to-one or many-to-many style transfer. Based on different combinations of selected style objects, multiple outputs can result. In this manner, multi-object style transfer of the present disclosure enables automated generation of multiple, novel designs with little user input.

In some examples, the object segmentation module 412 processes the style image 424 in view of the object(s) 426 to identify and segment the object(s) within the style image 424 and provide respective object masks. For example, the object segmentation module 412 processes the style image 424 using MaskRCNN and RefineNet+SceneCut to extract boundaries of objects and surfaces within the style image 424. The object(s) 426 indicate which of one or more objects segmented within the style image 424 are to provide the style that is to be applied to the object(s) of the content image 420. In the example of FIG. 4, the object 426 can indicate chair. Consequently, a chair depicted in the content image 420 can be determined to be the source of the style for style transfer.

In some examples, output of the object segmentation module 412 is processed by the boundary extraction module 414 to provide an object image (Tow) 428. For example, the boundary extraction module 414 extracts the object from the image based on a boundary determined by the object segmentation module 412 to provide the object image 428. In the example of FIG. 4, the object image 428 depicts a single object, the style of which is to be used for style transfer. In this manner, the specific style of the depicted object is extracted from the style image 424, and the object image 428 can itself be considered a style image. Accordingly, it can be said that a style of the style image 424 is a collection of styles of respective objects within the style image 424, while a style of the object image 428 is a style of the object(s)

depicted in the object image 428. That is, the object image 428 depicts a style sub-set with respect to the style image 424.

In some implementations, the content image 420 and the object image 428 are provided as input to the style transfer module 408. The style transfer module 408 executes style transfer, as described herein, to provide a stylized content image ($I_{C,S}$) 430. That is, the style of the object(s) depicted in the object image 428 is transferred to the content depicted in the content image 420. In this manner, the entirety of the content depicted in the content image 420 is stylized based on a style sub-set of the style image 424 (i.e., the style depicted in the object image 428). In some examples, the stylized content image 430 is processed by the mask application module 410 to provide a masked stylized content image ($I_{C,S,M}$) 432. In some examples, the mask that is provided from the mask application module 404 used to provide the masked content image 422 can be inverted to provide the mask that is applied to the stylized content image 430 to provide the masked stylized content image 432. In some examples, the masked stylized content image 432 depicts only the one or more objects, to which the style of the object image 428 has been applied, and is absent a remainder of the content of the stylized content image 430. That is, the mask applied by the mask application module 410 masks out the remainder of the stylized content image leaving only the stylized object(s). In the depicted example, only the couch is depicted in the masked stylized content image 432, the couch having been stylized based on the style of the object image 428.

In some implementations, the merge module 406 merges the masked content image 422 and the masked stylized content image 432 to provide the output image 434. In this manner, the stylized object(s) of the masked stylized content image 432 are provided with original, non-stylized content of the content image 420 that is depicted in the masked content image 422. In the example of FIG. 4, the stylized couch is depicted in the output image 434 (the couch having been stylized based on the style of the object image 428) and is surrounded by non-stylized content originally depicted in the content image 420.

Although FIG. 4 depicts stylization of a single object, implementations of the present disclosure can be used to provide stylization of multiple objects within a content image, while a remainder (e.g., other content/objects) remain un-stylized (i.e., remain in their original style).

In some implementations, the design generation assistant 208 of FIG. 2 further provides for shape generation. That is, and as described in further detail herein, an object can be generated based on a set of objects (e.g., two or more objects), the object having a shape based on shapes of the objects in the set of objects. In some examples, features of objects in the set of objects are combined using a ML model (e.g., a deep neural network) to provide a resulting object. In some examples, the ML model is trained based on a database of multi-dimensional object models. For example, the database can include three-dimensional (3D) models of objects (e.g., chairs, tables, couches), each 3D model including features. Example features can include, without limitation, style, orientation with respect to a camera, color, brightness, and the like.

In some examples, the ML model includes a neural network that is trained to be capable of generating two-dimensional (2D) projections of the 3D models (e.g., 2D images of 3D models) based on a set of input parameters. Example input parameters include, without limitation, model number (defining the style), viewpoint, color, brightness, saturation, zoom, and the like. In some examples, the ML model is trained with standard backpropagation to minimize the Euclidean reconstruction error of the generated images. In some examples, an image is provided as input to the ML model, which processes the image to extract latent space representations and generate one or more images. In some examples, the generated images each depict an object having a shape, style, and/or colors based on shapes of the set of objects.

Figure 5:
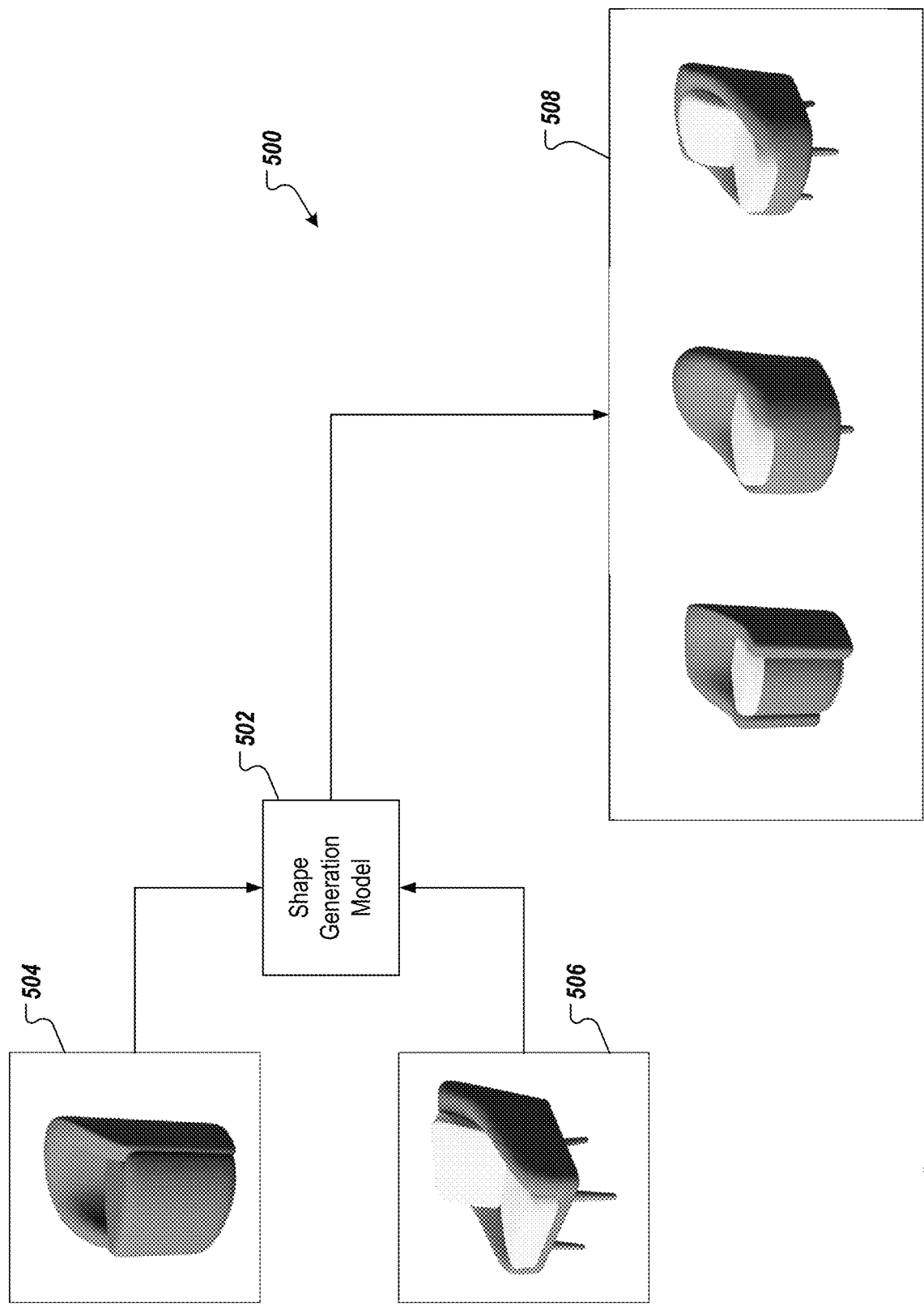
FIG. 5 depicts an example conceptual architecture for shape generation in accordance with implementations of the present disclosure.

FIG. 5 depicts an example conceptual architecture 500 for shape generation in accordance with implementations of the present disclosure. In the examples of FIG. 5, a shape generation model 502 is provided, which receives images 504, 506 as input to generate a set of images 508. In some examples, each image 504, 506 depicts a respective object and associated features (e.g., colors, brightness). In some examples, each image in the set of images 508 is based on a combination of objects and associated features of the images 504, 506.

As introduced above, the AI-based design platform provides a regulation assistant that identifies regulations that may be relevant to a particular design. For example, and with reference to the example use case, governmental agencies (e.g., the Federal Aviation Authority (FAA) of the United States) have regulations regarding various aspects of airline seating and airline seating arrangements (e.g., number of seats in a row, width of aisles). In accordance with implementations of the present disclosure, the regulation assistant uses information extraction (IE) and natural language processing (NLP) to identify regulations from regulatory documents that may be relevant to a component (e.g., seat) and/or a space (e.g., aircraft cabin) that is being designed. With continued reference to the example use case, example regulatory documents include the Code of Federal Regulations (CFR) Title 14, Chapter I, Part 25, Sub-parts A-I promulgated by the government of the United States.

FIGS. 6A-6D depict aspects of a regulation assistant in accordance with implementations of the present disclosure. In general, and as described in further detail herein, the regulation assistant uses preprocessing units for text and tables provided from regulatory documents and uses an answer extraction unit to provide answers based on data determined from the regulatory documents. In some examples, the preprocessing unit converts raw text to cohesive sections and converts raw tables to tuples (e.g., resource description framework (RDF) triples). The cohesive sections and tuples provide a corpus of regulatory data, from which the answer extraction unit can extract answers (e.g., regulations) that may be applicable to a particular design.

Figure 6A:
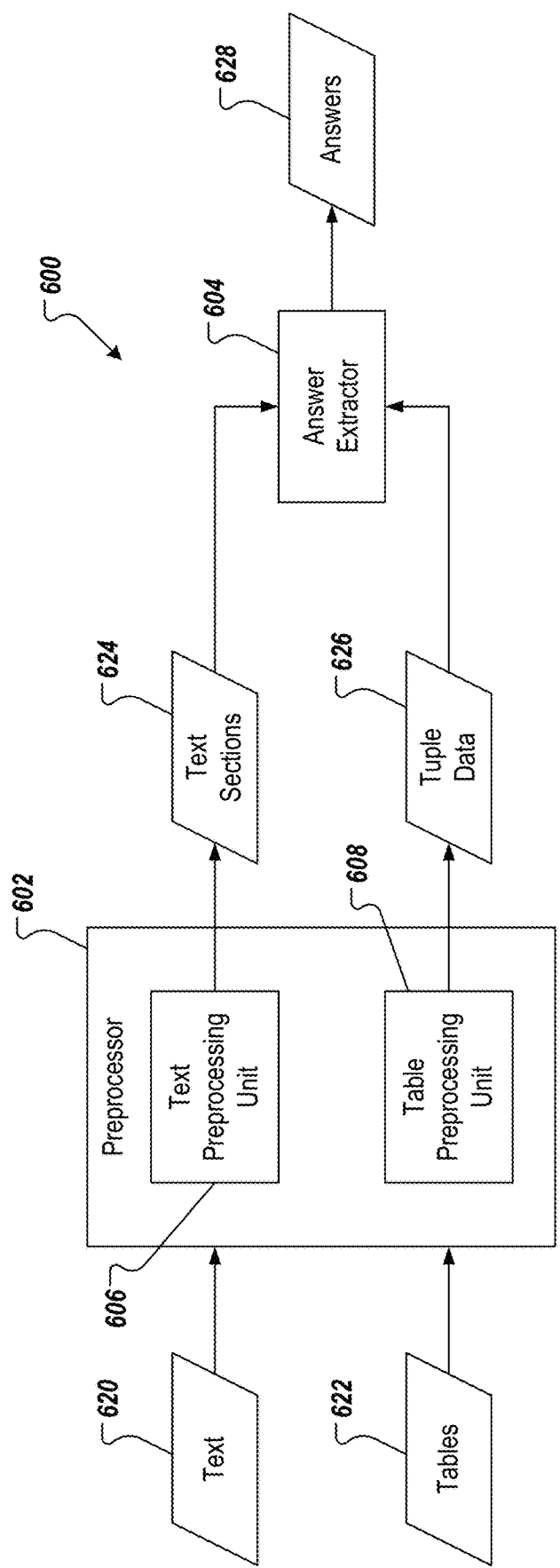
FIGS. 6A-6D depict aspects of a regulation assistant in accordance with implementations of the present disclosure.

FIG. 6A depicts a conceptual architecture 600 to provide query results (referred to herein as answers) from regulatory documents that are relevant to a component (e.g., seat) and/or a space (e.g., aircraft cabin) that is being designed. The example conceptual architecture 600 includes a preprocessor 602 and an answer extractor 604. The preprocessor 602 includes a text preprocessing unit 606 and a table preprocessing unit 608. In some implementations, a regulatory document can include text data 620 and/or table data 622. The text preprocessing unit 606 processes the text data 620 to provide one or more text section data 624, as described in further detail herein. The table preprocessing unit 608 processes the table data 622 to provide one or more tuple data 626, as described in further detail herein. As also described in further detail herein, the answer extractor 604 processes the text section data 624 and the tuple data 626 to provide answer data 628.

Figure 6B:
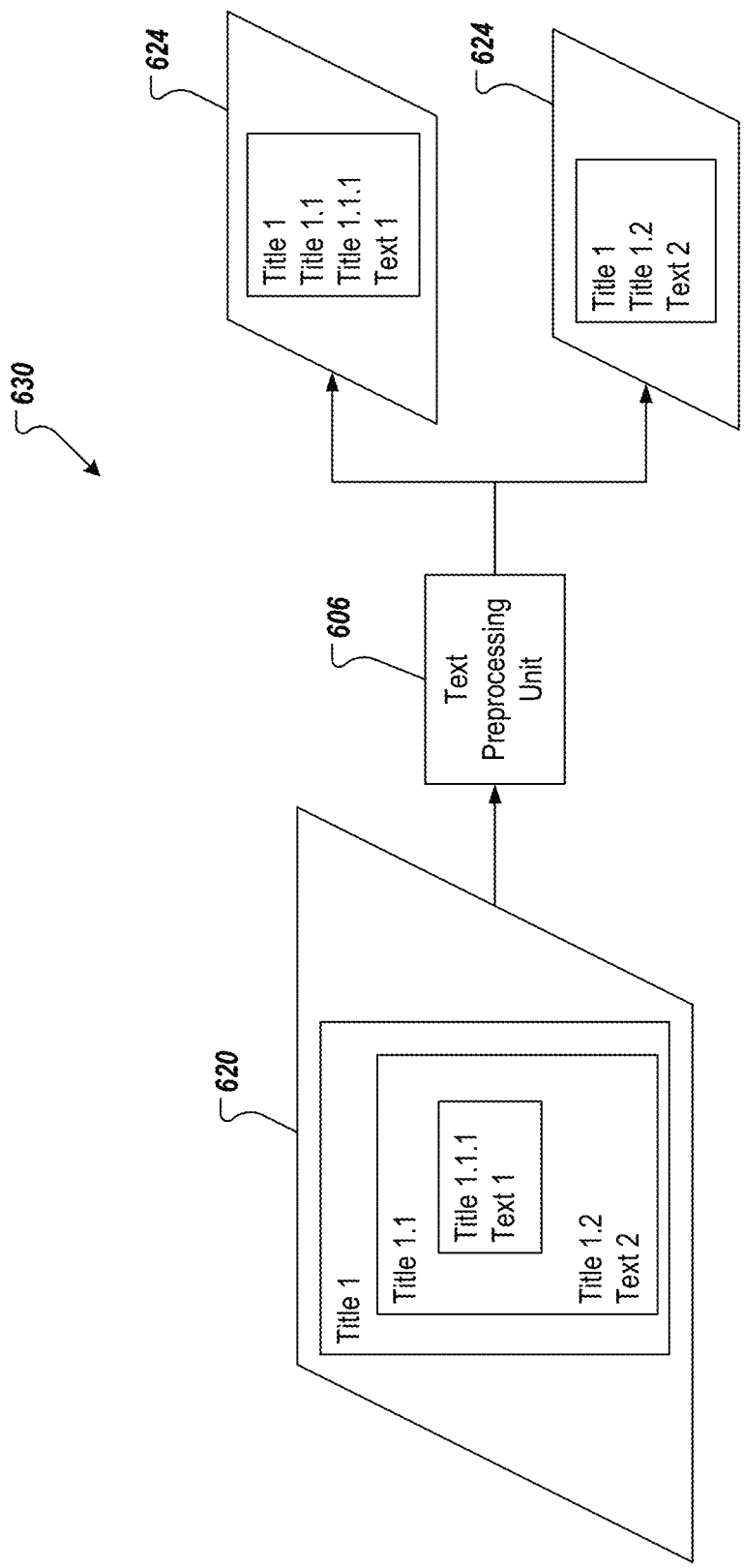

FIG. 6B depicts an example flow 630 for providing text section data 624 from text data 620 using the text preprocessing unit 606. In the example of FIG. 6B, the text data 620 includes a title (Title 1) with a first sub-title (Title 1.1) and a second sub-title (Title 1.2). The first sub-title includes a sub-title (Title 1.1.1), which includes first text (Text 1). The second sub-title includes second text (Text 2) with no further sub-titles. The text preprocessing unit 606 extracts the smallest granularities of sections and appends the section text after the text of each of the titles above the section. In the example of FIG. 6B, first text section data 624 is provided, which includes the title, the first sub-title and its sub-title and the first text, and a second text section data 624 is provided, which includes the title, the second sub-title and the second text. Each of the text section data 624 is stored in computer-readable memory and can be used for extracting answers, as described in further detail herein.

Figure 6C:
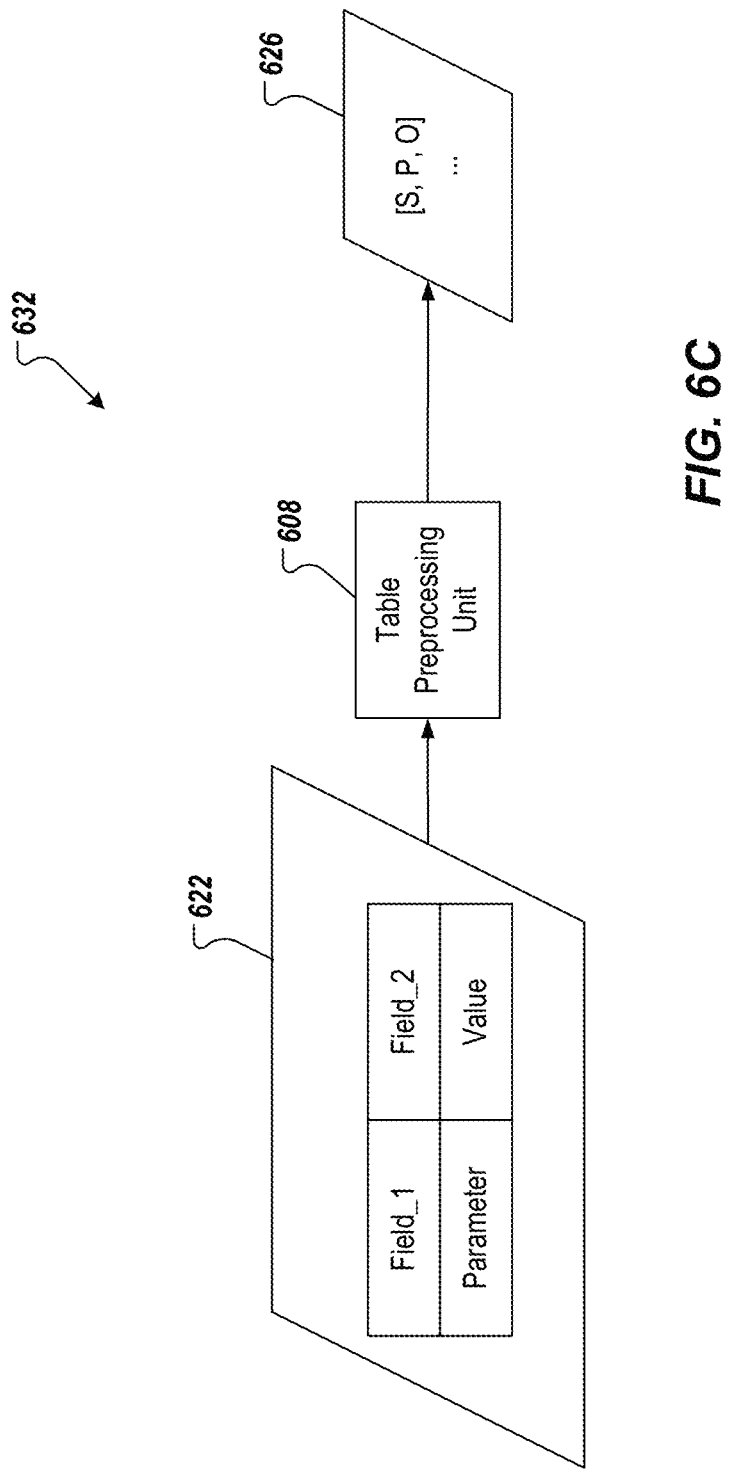

FIG. 6C depicts an example flow 632 for providing tuple data 626 from table data 622. As introduced above, the tuple data 626 can be provided as RDF triples that are extracted from the table data 622, each RDF triple including a subject (S), a predicate (P), and an object (0). In the example of FIG. 6C, the table data 622 includes a first column (Field 1) and a second column (Field 2). The first column includes a parameter (Parameter) and the second column records a value (Value) of the parameter. Referring again to the example use case, the table data 622 can represent passenger aisle width within an aircraft cabin, the parameter can include a passenger seating capacity (e.g., number of passenger seats within the aircraft), and the value can include an aisle width (e.g., in inches). In some implementations, within the RDF triple, the value can be separated using a keyword. An example keyword includes finalanswer.

Continuing with the example use case, the following example tuples can be provided from the example table data representing passenger aisle width within aircraft cabin:
  Width\nParameter Less than 25 in. from floor 10 or less\tseats finalanswer 12
  Width\nParameter 25 in. and more from floor 10 or less\tseats finalanswer 15
  Width\nParameter Less than 25 in. from floor 11 through 19\tseats finalanswer 12
  Width\nParameter 25 in. and more from floor 11 through 19\tseats finalanswer 20
  Width\nParameter Less than 25 in. from floor 20 or more\tseats finalanswer 15
  Width\nParameter 25 in. and more from floor 20 or more\tseats finalanswer 20

As introduced above, the answer extractor 604 provides answer data 628 based on the text section data 624 and the tuple data 626. In general, and as described in further detail herein, the answer extractor 604 includes a deep learning model for extracting query features and candidate answer features to provide sentence-level answer extraction. For example, the text data 624 (cohesive sections) are used to train a neural network in the answer extraction unit, described in further detail herein. In some examples, the tuple data 626 (RDF triples) is used to make one or more knowledge graphs using triplets. As described herein, the knowledge graph is used to identify an answer for a query.

Figure 6D:
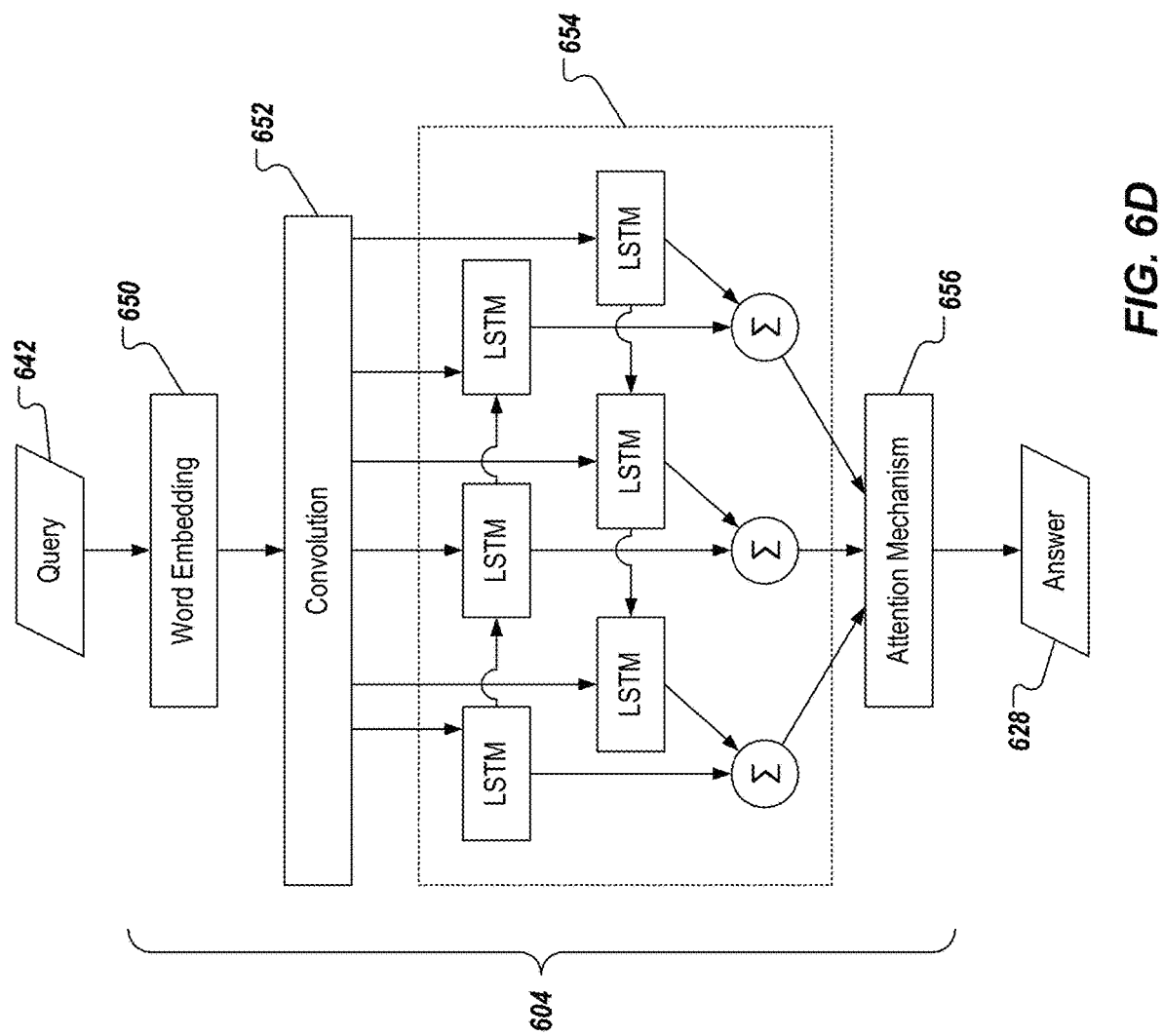

FIG. 6D depicts an example conceptual architecture for the answer extractor 604, which provides answer data 628 in response to a query 642. In the example of FIG. 6D, the answer extractor 604 includes a word embedding layer 650, a convolution layer 652, an encoder layer 654, and an attention layer 656. In some implementations, the word embedding layer 650 processes individual words of the query 642 to provide respective word embeddings. In some examples, one or more words of the query 642 are removed (e.g., stop words) such that word embeddings are only provided for meaningful words. In some examples, a word embedding can be described as a mathematical embedding from a space with one dimension per word to a continuous vector space with multiple dimensions. In other words, each word of the query is represented as real-valued vector in a predefined vector space. In some examples, each word is mapped to one vector and the vector values are learned.

In some implementations, the convolution layer 652 includes a convolution neural network (CNN), which learns the internal syntactic structure of sentences based on the word embeddings. This removes reliance on external resources, such as parse trees. In general, CNNs can include an input layer, a set of hidden layers, and an output layer. In some examples, the set of hidden layers can include convolutional layers, a rectified linear unit (RELU) layer (e.g., an activation function), pooling layers, fully connected layers, and normalization layers. In some implementations, the CNN includes a pooling layer (e.g., a maximum pooling layer, an average pooling layer). In general, the pooling layer provides for non-linear down-sampling to reduce a dimensionality of the output of the convolution layer 652. CNNs are good at extracting and representing features for unstructured text. CNN perform well in extracting n-gram features at different positions of a sentence through filters and can learn short and long-range relations through pooling operations.

In some implementations, the output of the convolution layer 652 is input to the encoder layer 654 as an input sequence. In some implementations, the encoder layer 654 includes a bi-directional long short-term memory (LSTM) encoder that captures word ordering in both a forward direction and a backwards direction and is able to capture features of n-grams independent of their positions in the sentences. In this manner, the encoder layer 654 captures long-range dependencies, which are common in queries. In the example of FIG. 6D, the encoder layer 654 includes a sequence-to-sequence deep learning model that may be used for learning use cases associated with sequential learning, where understanding of the meaning of words and text is provided through context of use. The encoder layer 654 includes multiple layers of LSTM cells, where one layer is used to learn in a forward direction, and another layer is used to learn in a reverse direction. The encoder layer 654 provides one or more answers as output, each answer being characterized by specific features/keywords of query.

In further detail, unlike conventional CNN architectures where the final layer outputs a confidence score after applying a softmax layer of the last layer, in the example of FIG. 6D, the output from convolution and max-pooling layers are used to provide encoded values, which are processed by the encoder (LSTM) layer 654. The attention layer 656 provides weights to specific inputs in the query that helps in predicting the answer(s) provided in the answer data 628 from the encoder layer 654.

In some implementations, the answer extraction discerns between types of queries. Example types of queries include, without limitation, a descriptive query and a factoid query. In some examples, discerning between a descriptive query and a factoid query can be performed by based on a type of question word in query. For example, a query that includes how, why, explain, define implies a descriptive query, and a query that includes what, which, when, who implies a factoid query (e.g., a one-word answer query). In some implementations, a knowledge graph can be used to answer factoid queries. The knowledge graph assistant as a tool can be used for other purposes also like extraction of key elements, relationship and dependency between different elements and the like. In some examples, the answer extractor (trained model described with reference to FIG. 6D) is used to identify answers for descriptive queries. The answers can be sentence level or paragraph level, for example.

In some examples, if the type of query is descriptive, a descriptive answer is provided, and, if the type of query is factoid, a factoid answer is provided. In some examples, a factoid answer is a single, factual answer. For example, an example query [What is the maximum number of seats per row in an aircraft having a single passenger aisle?] can be determined to be a factoid query, and an example factoid answer can include: 3. As another example, an example query [What is the aisle width for more than 50 capacity?] can be determined to be a descriptive query, and an example descriptive answer can include:

The minimum main passenger aisle width is 15 inches for less than 25-inches from floor having passenger seating capacity 20 or more|0.93

The minimum main passenger aisle width is 20 inches for 25-inches and more from floor having passenger seating capacity 20 or more|0.87

The minimum main passenger aisle width is 20 inches for less than 25-inches from floor having passenger seating capacity of 10 or less|0.10

In the above example, the values (e.g., 0.93, 0.87, 0.10) provided after the descriptive text indicate a confidence level of the answer extraction in the respective answer. The higher the value, the more confidence in the accuracy of the answer.

In some implementations, queries can be actively submitted to the regulation assistant to retrieve one or more answers. For example, a user using the AI-based design platform of the present disclosure can submit a query through a user interface (UI), the query is processed by the regulation assistant, and a query response is provided to the user through the UI. In some implementations, queries can be passively submitted to the regulation assistant to retrieve one or more answers. For example, one or more queries can be automatically submitted (i.e., without user input) based on a subject matter of a design that the user is working on. For example, if the user is designing an aircraft seat, one or more queries can automatically be submitted to the answer extractor to retrieve regulations that are relevant to aircraft seats (e.g., regulated dimensions, load capacity, aisle widths). As another example, if the user is designing an aircraft interior, one or more queries can automatically be submitted to the answer extractor to retrieve regulations that are relevant to aircraft interiors (e.g., regulated materials for flooring, slip properties of flooring, aisle widths, seat numbers per row). In some examples, query response is provided to the user through the UI, and the user can select query responses deemed relevant to their work.

In some implementations, text data and tuple data can be provided for specific subject matter. For example, for design of an aircraft interior, a first set of regulatory documents can be processed, which are applicable to aircraft interiors, to provide a first database that can be used for answers specific to aircraft interiors. As another example, for design of a passenger train interior, a second set of regulatory documents can be processed, which are applicable to passenger train interiors, to provide a second database that can be used for answers specific to passenger train interiors. As another example, for design of a passenger ship interior, a third set of regulatory documents can be processed, which are applicable to passenger ship interiors, to provide a third database that can be used for answers specific to passenger ship interiors. As still another example, for design of a passenger vehicle interior, a fourth set of regulatory documents can be processed, which are applicable to passenger vehicle interiors, to provide a fourth database that can be used for answers specific to passenger vehicle interiors.

In some implementations, a database can include two or more sub-databases that are each specific to a sub-set of a respective design subject. With reference to aircraft interiors as an example design subject, example sub-sets can include, without limitation, cabin, set, floor, and wall. In some examples, a sub-database can be specific to a sub-set. For example, a sub-database that provides text data and tuple data for aircraft seats can be provided.

In some implementations, a database for providing answers is selected based on the subject matter of a design project. For example, the AI-based design platform enables a user to select subject matter of a design. In some examples, a list of design subjects can be displayed to the user (e.g., in the UI), from which the user can select a design subject. Example design subjects can include, without limitation, aircraft interior, passenger train interior, passenger ship interior, and passenger vehicle interior. In some examples, a particular database is selected in response to user selection of a design subject. In some examples, a particular sub-database can be selected in response to user selection of a sub-set of the design subject.

In some implementations, multiple answer extractors can be provided, each answer extractor being specific to a design subject. For example, for design of an aircraft interior, a first answer extractor can be provided for answers specific to aircraft interiors. As another example, for design of a passenger train interior, a second answer extractor can be provided for answers specific to passenger train interiors. As another example, for design of a passenger ship interior, a third answer extractor can be provided for answers specific to passenger ship interiors. As still another example, for design of a passenger vehicle interior, a fourth answer extractor can be provided for answers specific to passenger vehicle interiors. In some implementations, an answer extractor is selected based on the subject matter of a design project.

Figure 7B:
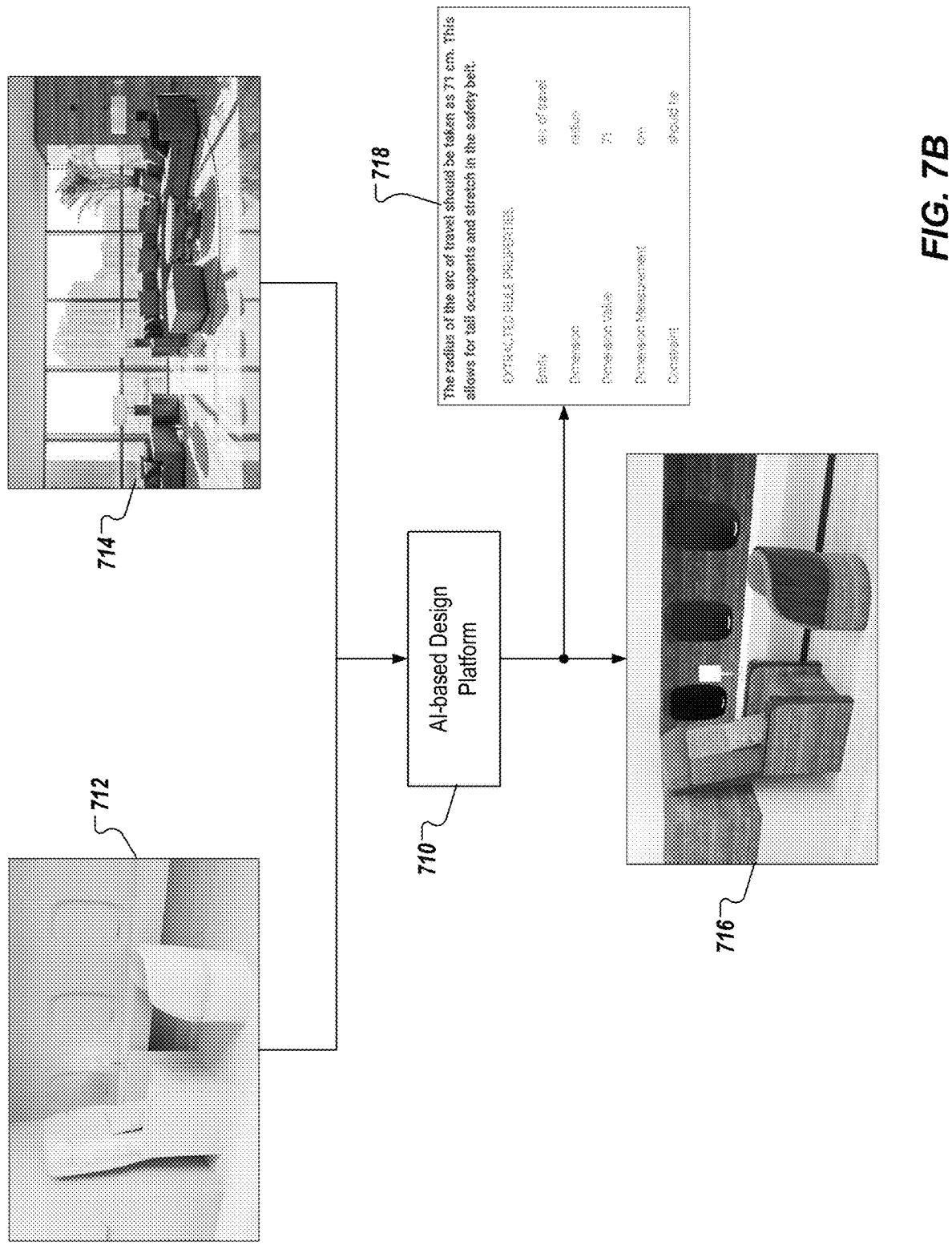
Figure 7C:
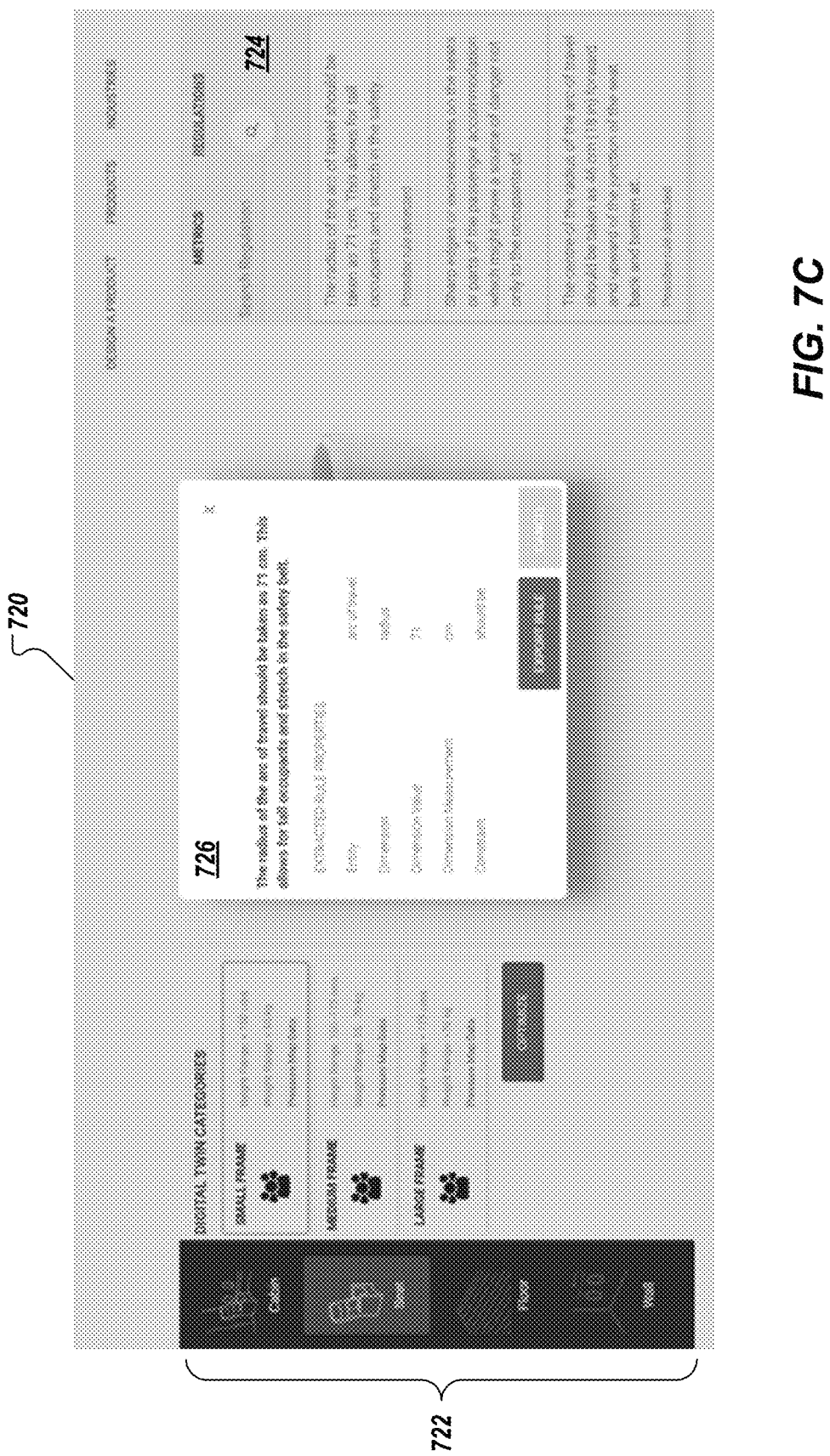

FIGS. 7A-7C depict the example use case in accordance with implementations of the present disclosure. As described herein, the example use case includes design of an aircraft interior including, for example, passenger seat design, flooring design, and interior wall design, and for which governmental regulations are to be considered.

FIG. 7A depicts examples snippets 700, 702, 704 of governmental regulations that are relevant to aircraft seating and interior layout. The example snippets 700, 702, 704 are provided as respective sections of CFR, Title 14, Chapter I, Part 25 introduced above. It is contemplated that any appropriate and/or relevant governmental regulations can be used (e.g., regulations of one or more other countries and/or jurisdictions). In accordance with implementations of the present disclosure, and as described above, governmental regulations, such as those depicted in the example snippets 700, 702, 704 can be processed to provide text data and tuple data (e.g., the text data 624 and the tuple data 626 of FIG. 6A) used to provide answers (e.g., from the answer extractor 604 of FIG. 6A). In some examples, the text data and tuple data of the example snippets 700, 702, 704 are used for training of an aircraft-specific answer extractor of the regulation assistant.

FIG. 7B depicts aircraft interior design generated using an AI-based design platform 710 of the present disclosure.

More particularly, the AI-based design platform 710 receives a content image 712 and a style image 714 and provides a design image 716 based thereon. In the depicted example, the AI-based design platform 710 also provides regulatory data 718 that is determined to be relevant to the design. In some examples, the AI-based design platform 710 generates the design image 716 using the multi-object style transfer described herein.

In further detail, objects depicted in the content image 712 can be generated by the design generation assistant. For example, and as described above with reference to FIG. 5, an object can be generated based on a set of objects processed using a ML model. In the example of FIG. 7B, example objects can include a seat and an ottoman. In some examples, the seat and the ottoman can each be generated based on processing images and/or multi-dimensional models of existing seats/ottomans using the ML model (e.g., the shape generation model 502 of FIG. 5). In the example of FIG. 7B, the generated seat and ottoman are included in an image of an aircraft interior, and are absent a style (e.g., depicted in white). In some examples, the style image 714 can be proposed by the design generation assistant. For example, and as described above, the trendspotting assistant can determine that the style depicted in the style image 714 is trending, or otherwise popular and can propose the style image (e.g., to a user of the AI-based design platform). For example, the style image 714 can be displayed in a selection of style images that depict styles that have been identified as trending styles. In some examples, the style image 714 can be selected and processed with the content image 712 through the multi-object style transfer of the present disclosure, as described herein with reference to FIG. 4) to provide the design image 716 (stylized image).

FIG. 7C depicts an example GUI 720 that can be displayed to the user by the AI-based design platform 710 to enable the user to interact with the AI-based design platform 710 to generate designs in accordance with implementations of the present disclosure. In the example of FIG. 7C, the GUI 720 is specific to an aircraft interior as the design subject. For example, the GUI 720 can be displayed in response to user selection of "Aircraft Interior" from a menu of design subjects displayed within an earlier GUI. In the depicted example, the GUI 720 includes a menu 722 that is specific to the selected design subject. In this case, the menu 722 enables user selection of a sub-set of the design subject (e.g., cabin, seat, floor, wall). In the depicted example, the sub-set of seat has been selected.

In the depicted example, the GUI 720 includes an answers interface 724 that displays any answers that have been determined to be relevant to the design subject and/or the sub-set of the design subject. In the depicted example, the answers interface 724 displays snippets of regulations that are determined to be relevant to the subject matter of the design (e.g., aircraft seat). In some examples, an answer window 726 is displayed to provide further detail with respect to an answer provided in the answers interface 724. For example, in response to user selection of (e.g., clicking on) an answer within the answers interface 724, the answer window 726 is displayed to provide further detail on the selected answer.

Figure 8:
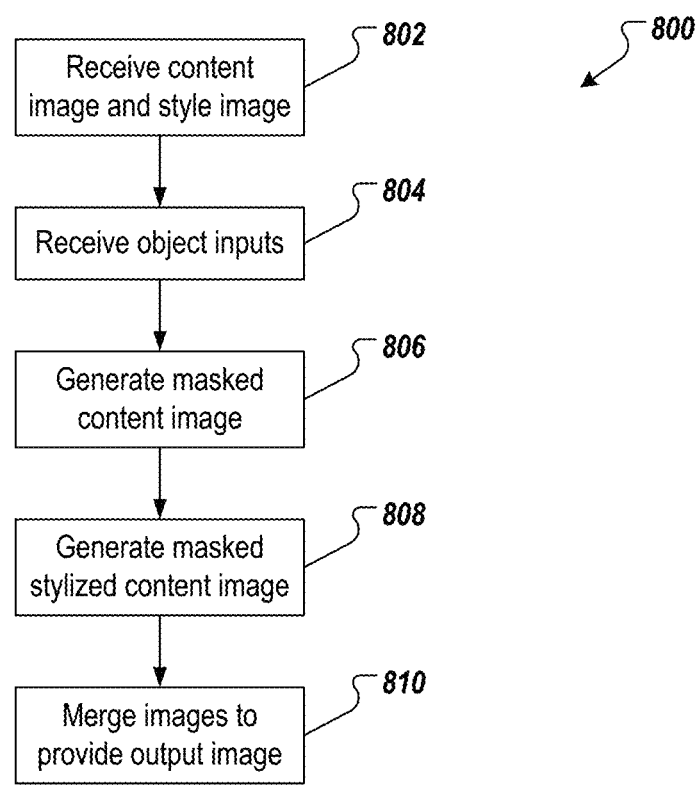
FIG. 8 depicts an example process that can be executed in accordance with implementations of the present disclosure.

FIG. 8 depicts an example process 800 that can be executed in accordance with implementations of the present disclosure. In some implementations, the example process 800 may be performed using one or more computer-executable programs executed using one or more computing devices.

A content image and a style image are received (802). For example, the design assistant 208 of FIG. 2, receives a content image and a style image. As described herein, the content image depicts one or more objects, to which a style within the style image is to be transferred. As also described herein, the style image depicts one or more objects that define the style that is to be transferred to the one or more objects of the content image. In some examples, the content image is provided through object generation based on one or more objects (e.g., as described above with reference to FIG. 5). In some examples, the style image is provided from the trendspotting assistant 210 of FIG. 2.

Object inputs are received (804). In some examples, an object input can be provided to indicate one or more objects of the content image that are to be stylized. For example, and as described above with reference to FIG. 4, a user provides input of couch, which indicates that any couch within the content image is to be stylized. In some examples, an object input can be provided to indicate one or more objects of the style image that are to be used to determine the style to be transferred to the one or more objects of the content image. For example, and as described above with reference to FIG. 4, a user provides input of chair, which indicates that any chair within the content image is to be used to determine the style.

A masked content image is generated (806). For example, and as described above with reference to FIG. 4, the content image is processed to identify and segment objects within the content image. In some examples, the content image is processed in view of the object input to identify and segment the object(s) within the content image and provide respective object masks. For example, the content image is processed using MaskRCNN and RefineNet+SceneCut to extract boundaries of objects and surfaces within the content image. The object input indicates which of one or more objects segmented within the content image are to have style transfer applied. In some implementations, one or more masks are applied to the content image to provide the masked content image. The masked content image includes objects identified based on the object input removed therefrom.

A masked stylized content image is generated (808). For example, and as described above with reference to FIG. 4, the style image is processed in view of the object input to identify and segment the objects within the style image and provide respective object masks. For example, the style image is processedf using MaskRCNN and RefineNet+SceneCut to extract boundaries of objects and surfaces within the style image, the object input indicating which of one or more objects segmented within the style image are to provide the style that is to be applied to one or more objects of the content image. In some examples, one or more objects are extracted based on boundaries determined within the style image, and an object image is provided, the style of which is to be used for style transfer. Style transfer is performed on the content image using the object image to provide a stylized content image that is processed to provide a masked stylized content image. In some examples, the masked stylized content image depicts only the one or more objects, to which the style of the object image has been applied and is absent a remainder of the content of the stylized content image.

Images are merged to provide an output image (810). For example, and as described above with reference to FIG. 4, the masked content image and the masked stylized content image are merged to provide the output image. In this manner, the stylized object(s) of the masked stylized content image are provided with original, non-stylized content of the content image that is depicted in the masked content image.

Figure 9:
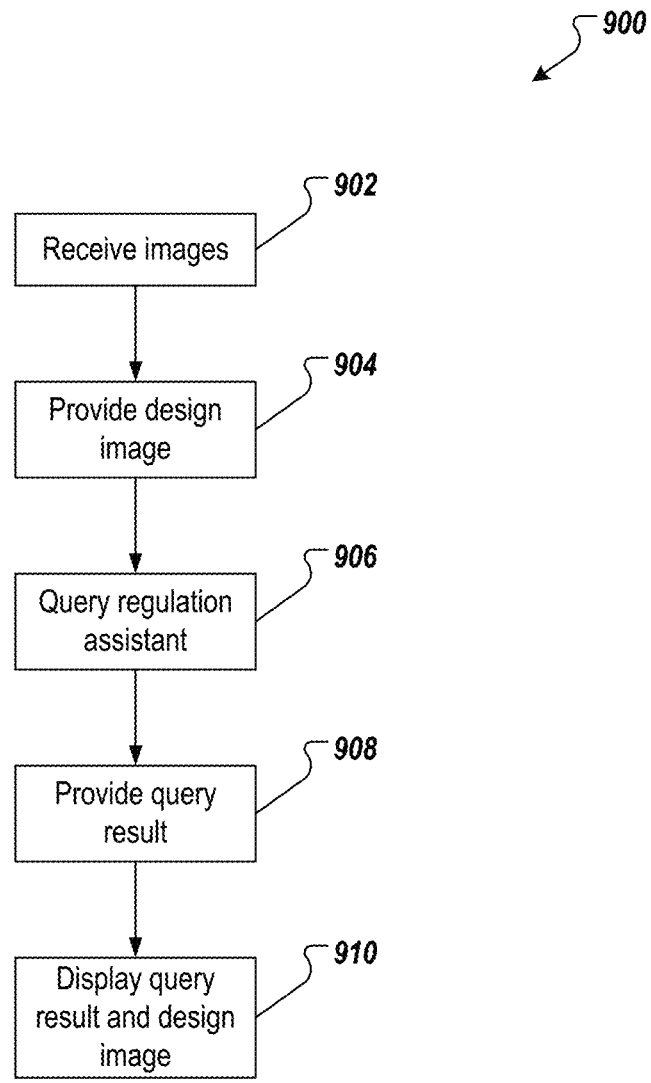
FIG. 9 depicts an example process that can be executed in accordance with implementations of the present disclosure.

FIG. 9 depicts an example process 900 that can be executed in accordance with implementations of the present disclosure. In some implementations, the example process 900 may be performed using one or more computer-executable programs executed using one or more computing devices.

A set of images is received (902). For example, a designer submits a content image and a style image to the design generation assistant 208. A design image is provided (904). For example, the design generation assistant 208 processes the design content image and the style image, as described herein, to transfer a style represented within the style image to one or more objects represented within the content image. A regulation assistant is queried (906). For example, a query that is relevant to a subject of the design image is submitted to the regulation assistant. In some examples, the query is an explicit query submitted by the designer. In some examples, the query is an implicit query that is automatically submitted to the regulation assistant based on the subject of the design image. A query result is provided (908). For example, and as described in further detail herein, the regulation assistant processes the query through a deep learning model to generate the query result. The design image and query result are displayed (910). For example, and as described herein, the design image and the query result are displayed within a GUI of the AI-based design platform of the present disclosure (e.g., FIG. 7C).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method for generating a design using an artificial intelligence (AI)-based platform comprising a suite of AI-based design assistants, the method comprising:
   receiving, by a design generation assistant of the AI-based design platform, a content image depicting a first set of objects and a style image depicting a second set of objects and a collective style;
   processing, by the design generation assistant, the content image using a set of machine learning (ML) models to determine a first sub-set of objects comprising one or more objects, to which a style is to be transferred from the style image, the first sub-set of objects comprising fewer objects than the first set of objects, the set of ML models comprising a first ML model to identify objects in the content image and a second ML model and a third ML model to identify planar surfaces in the content image to segment the objects and determine the first sub-set of objects;
   processing, by the design generation assistant, the style image using the set of ML models to determine a second sub-set of objects comprising one or more objects, from which the style is to be transferred to objects in the first sub-set of objects; and
   generating, by the design generation assistant, an output image depicting one or more stylized objects, each stylized object comprising an object in the first sub-set of objects having the style of the one or more objects in the second sub-set of objects, a remainder of the output image comprising un-stylized content of the content image.

2. The method of claim 1, wherein generating the output image comprises merging a masked content image and a masked stylized content image, the masked content image depicting the un-stylized content of the content image and masking the first sub-set of objects, the masked stylized content image depicting the stylized objects and masking other content.

3. The method of claim 1, wherein an object image is provided from the style image, the object image depicting second sub-set of objects.

4. The method of claim 3, wherein generating the output image comprises providing the content image and the object image as input to a style transfer model that generates a stylized content image based on the style of the object image, content in the content image being stylized to provide the stylized content image.

5. The method of claim 4, wherein the style transfer model comprises PhotoWCT.

6. The method of claim 1, wherein the first sub-set of objects is determined based on object input that indicates at least one type of object that is to be stylized.

7. The method of claim 1, wherein the second sub-set of objects is determined based on object input that indicates at least one type of object, from which the style is to be transferred to objects in the first sub-set of objects.

8. The method of claim 1, wherein the first ML model comprises MaskRCNN, the second ML model comprises SceneCut, and the third ML model comprises RefineNet.

9. The method of claim 1, wherein the style image is provided from a trendspotting assistant of the AI-based design platform.

10. A non-transitory computer-readable storage medium coupled to one or more processors and having instructions stored thereon which, when executed by the one or more processors, cause the one or more processors to perform operations for generating a design using an artificial intelligence (AI)-based platform comprising a suite of AI-based design assistants, the operations comprising:
   receiving, by a design generation assistant of the AI-based design platform, a content image depicting a first set of objects and a style image depicting a second set of objects and a collective style;
   processing, by the design generation assistant, the content image using a set of machine learning (ML) models to determine a first sub-set of objects comprising one or more objects, to which a style is to be transferred from the style image, the first sub-set of objects comprising fewer objects than the first set of objects, the set of ML models comprising a first ML model to identify objects in the content image and a second ML model and a third ML model to identify planar surfaces in the content image to segment the objects and determine the first sub-set of objects;
   processing, by the design generation assistant, the style image using the set of ML models to determine a second sub-set of objects comprising one or more objects, from which the style is to be transferred to objects in the first sub-set of objects; and
   generating, by the design generation assistant, an output image depicting one or more stylized objects, each stylized object comprising an object in the first sub-set of objects having the style of the one or more objects in the second sub-set of objects, a remainder of the output image comprising un-stylized content of the content image.

11. The computer-readable storage medium of claim 10, wherein generating the output image comprises merging a masked content image and a masked stylized content image, the masked content image depicting the un-stylized content of the content image and masking the first sub-set of objects, the masked stylized content image depicting the stylized objects and masking other content.

12. The computer-readable storage medium of claim 10, wherein an object image is provided from the style image, the object image depicting second sub-set of objects.

13. The computer-readable storage medium of claim 12, wherein generating the output image comprises providing the content image and the object image as input to a style transfer model that generates a stylized content image based on the style of the object image, content in the content image being stylized to provide the stylized content image.

14. The computer-readable storage medium of claim 13, wherein the style transfer model comprises PhotoWCT.

15. The computer-readable storage medium of claim 10, wherein the first sub-set of objects is determined based on object input that indicates at least one type of object that is to be stylized.

16. The computer-readable storage medium of claim 10, wherein the second sub-set of objects is determined based on object input that indicates at least one type of object, from which the style is to be transferred to objects in the first sub-set of objects.

17. The computer-readable storage medium of claim 10, wherein the first ML model comprises MaskRCNN, the second ML model comprises SceneCut, and the third ML model comprises RefineNet.

18. The computer-readable storage medium of claim 10, wherein the style image is provided from a trendspotting assistant of the AI-based design platform.

19. A system, comprising:
one or more computers; and
a computer-readable storage device coupled to the computing device and having instructions stored thereon which, when executed by the computing device, cause the computing device to perform operations for generating a design using an artificial intelligence (AI)-based platform comprising a suite of AI-based design assistants, the operations comprising:
receiving, by a design generation assistant of the AI-based design platform, a content image depicting a first set of objects and a style image depicting a second set of objects and a collective style;
processing, by the design generation assistant, the content image using a set of machine learning (ML) models to determine a first sub-set of objects comprising one or more objects, to which a style is to be transferred from the style image, the first sub-set of objects comprising fewer objects than the first set of objects, the set of ML models comprising a first ML model to identify objects in the content image and a second ML model and a third ML model to identify planar surfaces in the content image to segment the objects and determine the first sub-set of objects;
processing, by the design generation assistant, the style image using the set of ML models to determine a second sub-set of objects comprising one or more objects, from which the style is to be transferred to objects in the first sub-set of objects; and
generating, by the design generation assistant, an output image depicting one or more stylized objects, each stylized object comprising an object in the first sub-set of objects having the style of the one or more objects in the second sub-set of objects, a remainder of the output image comprising un-stylized content of the content image.

20. The system of claim 19, wherein generating the output image comprises merging a masked content image and a masked stylized content image, the masked content image depicting the un-stylized content of the content image and masking the first sub-set of objects, the masked stylized content image depicting the stylized objects and masking other content.

21. The system computer of claim 19, wherein an object image is provided from the style image, the object image depicting second sub-set of objects.

22. The system of claim 21, wherein generating the output image comprises providing the content image and the object image as input to a style transfer model that generates a stylized content image based on the style of the object image, content in the content image being stylized to provide the stylized content image.

23. The system of claim 22, wherein the style transfer model comprises PhotoWCT.

24. The system of claim 19, wherein the first sub-set of objects is determined based on object input that indicates at least one type of object that is to be stylized.

25. The system of claim 19, wherein the second sub-set of objects is determined based on object input that indicates at least one type of object, from which the style is to be transferred to objects in the first sub-set of objects.

26. The system of claim 19, wherein the first ML model comprises MaskRCNN, the second ML model comprises SceneCut, and the third ML model comprises RefineNet.

27. The system of claim 19, wherein the style image is provided from a trendspotting assistant of the AI-based design platform.

* * * * *

UNITED STATES PATENT AND TRADEMARK OFFICE
CERTIFICATE OF CORRECTION

| | |
|---|---|
| PATENT NO. | : 10,950,021 B2 |
| APPLICATION NO. | : 16/391429 |
| DATED | : March 16, 2021 |
| INVENTOR(S) | : Alpana A. Dubey et al. |

It is certified that error appears in the above-identified patent and that said Letters Patent is hereby corrected as shown below:

In the Claims

Claim 21, Column 26, Line 29, after "system" delete "computer".

Signed and Sealed this
Thirteenth Day of February, 2024

Katherine Kelly Vidal
*Director of the United States Patent and Trademark Office*